(12) United States Patent
Watanabe

(10) Patent No.: US 8,896,879 B2
(45) Date of Patent: Nov. 25, 2014

(54) DEVICE AND METHOD FOR STEREOSCOPIC IMAGE PRINTING

(71) Applicant: FUJIFILM Corporation, Tokyo (JP)

(72) Inventor: Mikio Watanabe, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 13/960,299

(22) Filed: Aug. 6, 2013

(65) Prior Publication Data

US 2013/0314678 A1 Nov. 28, 2013

Related U.S. Application Data

(63) Continuation of application No. PCT/JP2012/052677, filed on Feb. 7, 2012.

(30) Foreign Application Priority Data

Feb. 8, 2011 (JP) ................................. 2011-025197

(51) Int. Cl.

| G06K 15/02 | (2006.01) |
|---|---|
| G06T 15/00 | (2011.01) |
| H04N 5/225 | (2006.01) |
| G03B 25/02 | (2006.01) |
| G03B 35/24 | (2006.01) |
| G09F 19/00 | (2006.01) |
| H04N 13/04 | (2006.01) |
| G03B 35/14 | (2006.01) |
| G09F 19/14 | (2006.01) |

(52) U.S. Cl.
CPC ................. *G03B 35/14* (2013.01); *G03B 35/24* (2013.01); *H04N 13/0447* (2013.01); *G03B 25/02* (2013.01); *G09F 19/14* (2013.01); *G09F 19/00* (2013.01)

USPC ............................. 358/1.2; 348/207; 345/419

(58) Field of Classification Search
CPC ........ G03B 25/02; G03B 35/14; G03B 35/24; G09F 19/00; G09F 19/14; H04N 13/0447
USPC .................................. 358/1.1–1.9, 1.11–1.18
See application file for complete search history.

(56) References Cited

U.S. PATENT DOCUMENTS 7,372,987 B2 *   5/2008   Tokuhashi et al. ............ 382/154
2001/0052935 A1 * 12/2001   Yano ............................. 348/207

(Continued)

FOREIGN PATENT DOCUMENTS

| JP | 2001-346226 A | 12/2001 |
|---|---|---|
| JP | 2006-212056 A | 8/2006 |

(Continued)

*Primary Examiner* — King Poon
*Assistant Examiner* — Ibrahim Siddo
(74) *Attorney, Agent, or Firm* — Birch, Stewart, Kolasch & Birch, LLP

(57) ABSTRACT

A method for stereoscopic image printing according to one aspect of the presently disclosed subject matter includes acquiring information on distribution of parallax of a multi-viewpoint image with two or more viewpoints; determining, based on the information on the distribution of parallax, a number of viewpoints of a stereoscopic image which is printed on a lenticular lens sheet; generating, if the number of viewpoints of the multi-viewpoint image is smaller than the determined number of viewpoints, a shortfall viewpoint image based on the inputted multi-viewpoint image; and printing a stereoscopic image which is made of the multi-viewpoint image and the generated viewpoint image.

20 Claims, 18 Drawing Sheets

(56) References Cited

U.S. PATENT DOCUMENTS

2006/0082574 A1* 4/2006 Tsubaki .................. 345/419
2006/0170674 A1   8/2006 Tsubaki et al.
2012/0194905 A1   8/2012 Ushio et al.

FOREIGN PATENT DOCUMENTS

| JP | 2007-98830 A | 4/2007 |
|----|--------------|--------|
| JP | 2011-81272 A | 4/2011 |
| WO | WO 2011/043022 A1 | 4/2011 |

* cited by examiner

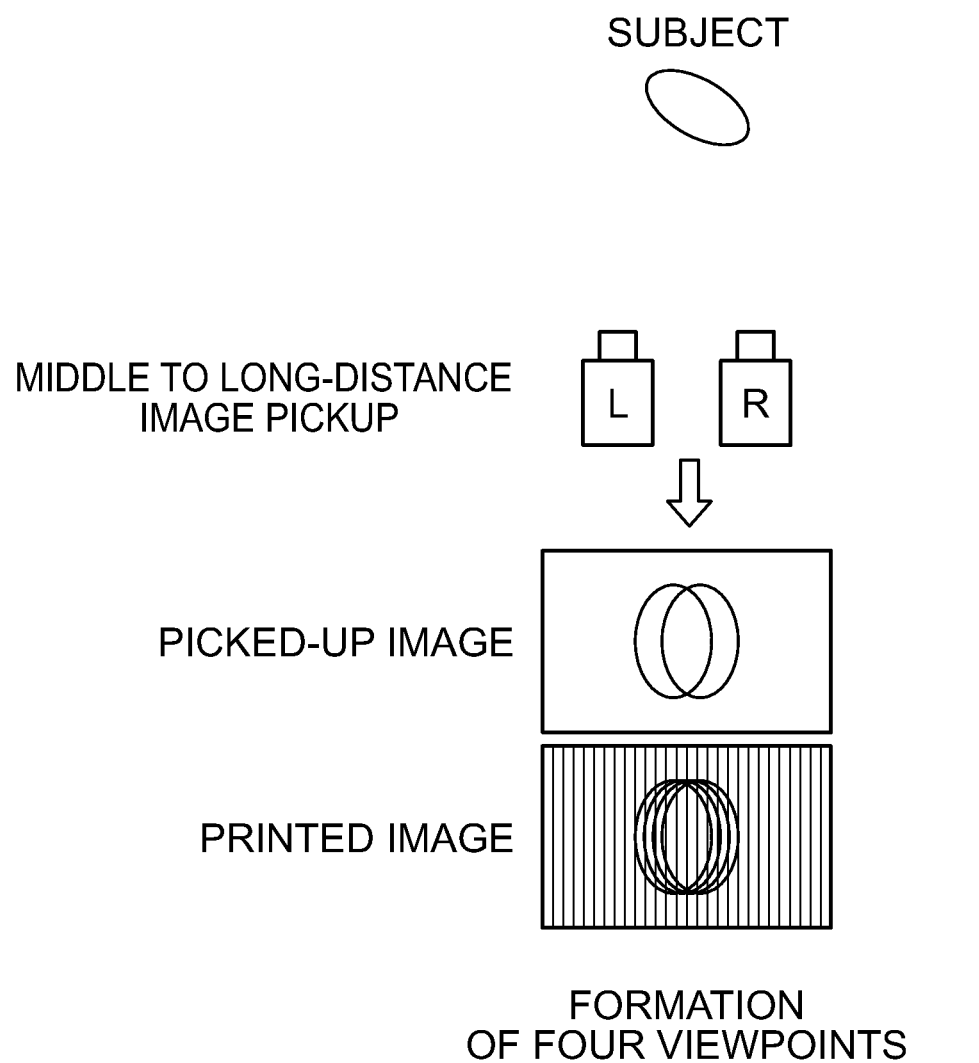

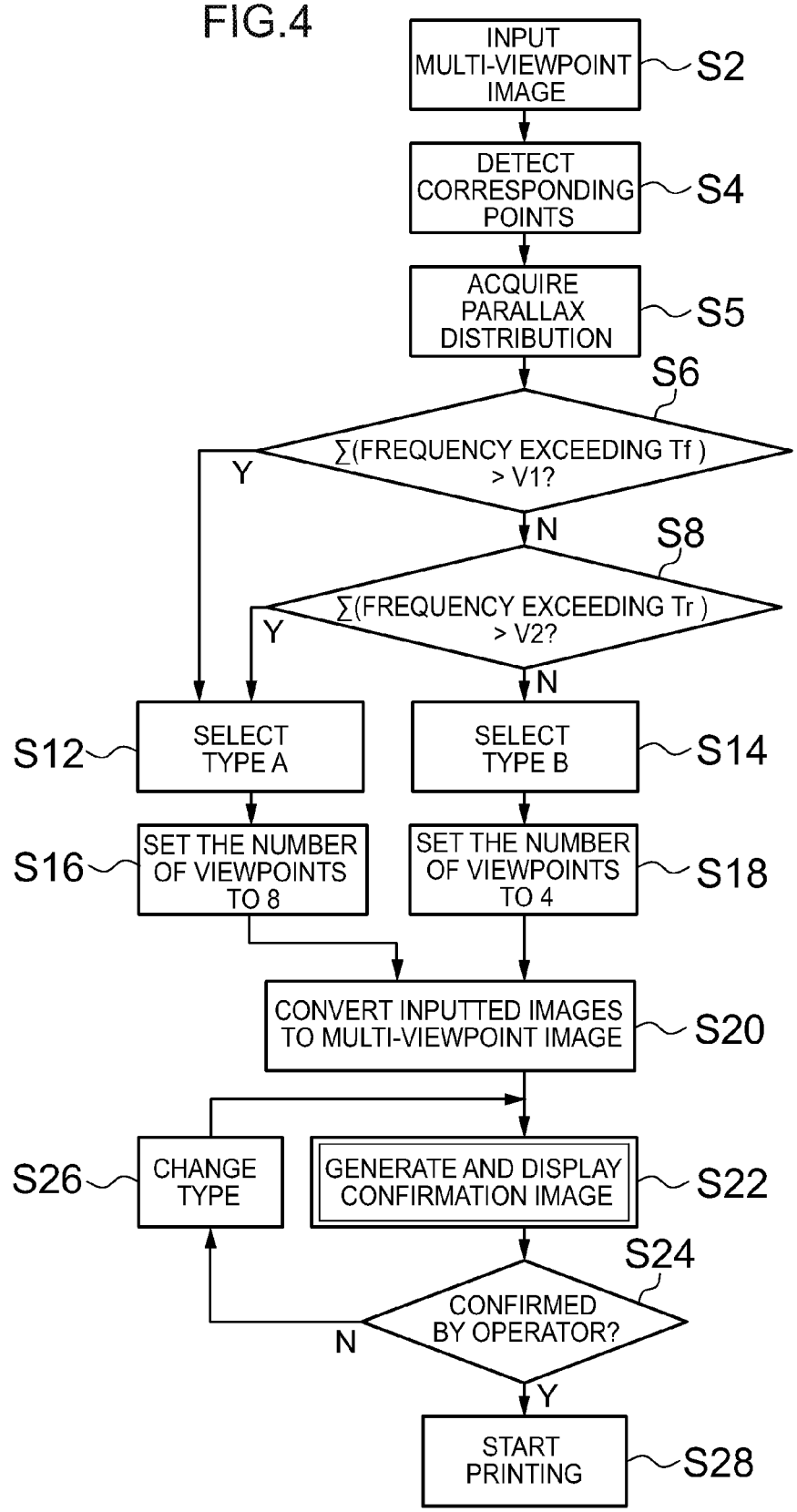

TYPE A

TYPE B

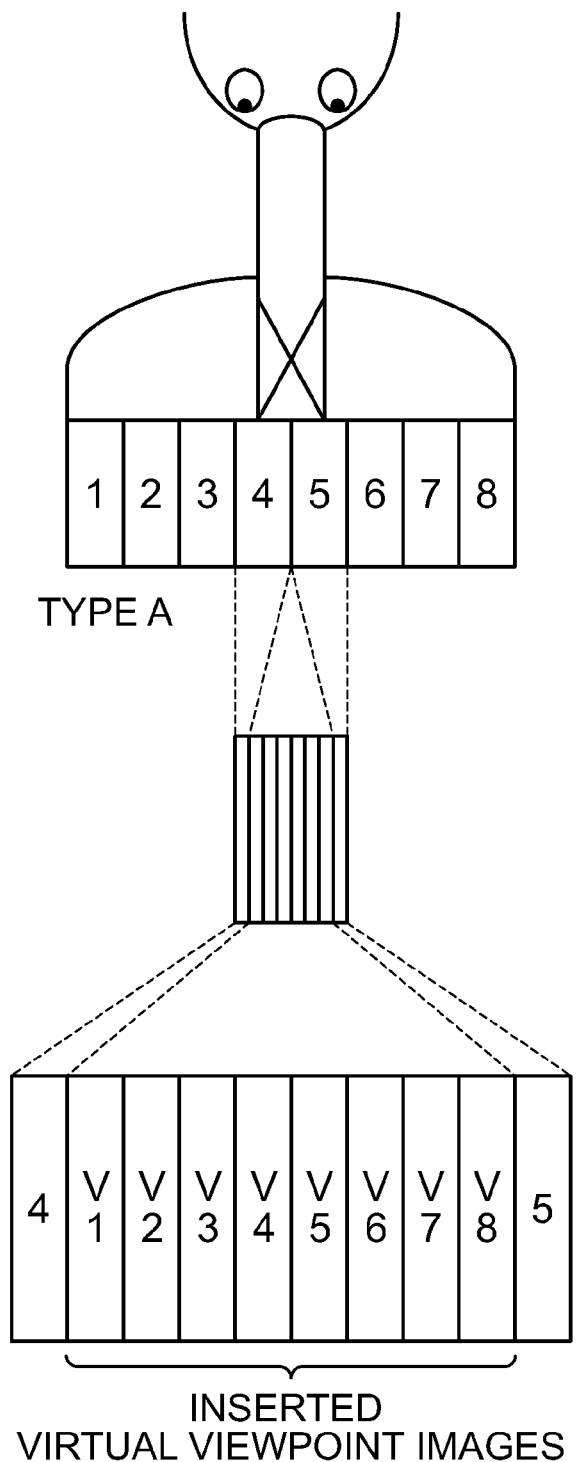

DEVICE AND METHOD FOR STEREOSCOPIC IMAGE PRINTING

CROSS-REFERENCE TO RELATED APPLICATIONS

This application is a PCT Bypass continuation application and claims the priority benefit under 35 U.S.C. §120 of PCT Application No. PCT/JP2012/052677 filed on Feb. 7, 2012 which application designates the U.S., and also claims the priority benefit under 35 U.S.C. §119 of Japanese Patent Application No. 2011-025197 filed on Feb. 8, 2011, which applications are all hereby incorporated in their entireties by reference.

BACKGROUND OF THE INVENTION

1. Field of the Invention

The presently disclosed subject matter relates to a device and method for stereoscopic image printing which can form a stereoscopic image, which is adaptable to parallax between inputted images, on a lenticular lens sheet.

2. Description of the Related Art

A technology is known to stereoscopically display images which are picked up from a plurality of viewpoints via a lens-shaped sheet.

Japanese Patent Application Laid-Open No. 2007-098830 discloses types of lenticular sheets being selected by a user or based on lens resolution.

Japanese Patent Application Laid-Open No. 2001-346226 discloses a technology to convert a stereo image to a multi-viewpoint image based on a parallax map.

SUMMARY OF THE INVENTION

In the case of stereoscopically displaying images which are picked up from a plurality of viewpoints via a lens-shaped sheet (lenticular lens sheet), the images are displayed on the sheet having the same shape although the images vary in their stereoscopic conditions (particularly in their parallax amount). Accordingly, there are such problems as images insufficient in stereoscopic effects and images that look out of focus or look overlapped due to the parallax amount exceeding an allowable display range contrary to the problem of images being insufficient.

The technology disclosed in Japanese Patent Application Laid-Open No. 2007-098830 only allows selection of data according to the types of media (lenticular lens sheets), and does not allow selection of media according to the parallax of an inputted stereoscopic image. It is also impossible to confirm in advance how an image looks like after the image is printed.

While Japanese Patent Application Laid-Open No. 2001-346226 discloses a technology for automatically performing multi-viewpoint formation, a technology for forming a stereoscopic image which is adaptable to the parallax of inputted images on a lenticular lens sheet is not disclosed.

The presently disclosed subject matter has been made in view of such circumstances, and it is an object of the presently disclosed subject matter to provide a device and method for stereoscopic image printing which can form a stereoscopic image which is adaptable to parallax of inputted images on a lenticular lens sheet.

In order to accomplish the above-stated object, one aspect of the presently disclosed subject matter provides a stereoscopic image printing device including: image input unit configured to input a multi-viewpoint image with two or more viewpoints; information acquisition unit configured to acquire information on distribution of parallax of the inputted multi-viewpoint image; number-of-viewpoint determination unit configured to determine, based on the information on the distribution of parallax acquired by the information acquisition unit, a number of viewpoints of a stereoscopic image which is printed on a lenticular lens sheet; comparison unit configured to compare a number of viewpoints of the multi-viewpoint image inputted via the image input unit and the number of viewpoints determined by the number-of-viewpoint determination unit; viewpoint image generation unit configured to generate, if the number of viewpoints of the multi-viewpoint image inputted via the image input unit is smaller than the number of viewpoints of the stereoscopic image which is printed on the lenticular lens sheet, a shortfall viewpoint image based on the inputted multi-viewpoint image; and printing unit configured to print the stereoscopic image including the multi-viewpoint image inputted via the image input unit and the viewpoint image generated by the viewpoint image generation unit, on the lenticular lens sheet.

In one aspect of the presently disclosed subject matter, the information acquisition unit may acquire information indicating at least one frequency, out of a frequency of a parallax amount which exceeds a first threshold on a near side and a frequency of a parallax amount which exceeds a second threshold on a far side among parallax amounts of the inputted multi-viewpoint image, and if the acquired frequency of the parallax amount which exceeds the first threshold exceeds a third threshold, or if the acquired frequency of the parallax amount which exceeds the second threshold exceeds a fourth threshold, the number-of-viewpoint determination unit may increase the number of viewpoints of the stereoscopic image which is printed on the lenticular lens sheet as compared with a case where they are within the third threshold or the fourth threshold.

More specifically, parallax amounts of an object image taken at a short distance and a secondary object image taken at a long distance have conventionally been beyond display capability, which caused failures such as blurred and broken images. In the present aspect, it becomes possible to solve this problem by increasing the number of viewpoints in accordance with the frequency of the parallax amounts.

In one aspect of the presently disclosed subject matter, the information acquisition unit may acquire information which indicates at least one maximum parallax amount out of near side and far side maximum parallax amounts among the parallax amounts of the inputted multi-viewpoint image, and if the acquired maximum parallax amount exceeds a specified threshold, the number-of-viewpoint determination unit may increase the number of viewpoints of the stereoscopic image which is printed on the lenticular lens sheet as compared with a case where the acquired maximum parallax amount is within the specified threshold.

More specifically, parallax amounts of an object image taken at a short distance and a secondary object image taken at a long distance have conventionally been beyond display capability, which caused failures such as blurred and broken images. In the present aspect, it becomes possible to solve this problem by increasing the number of viewpoints in accordance with the maximum parallax amount.

In one aspect of the presently disclosed subject matter, the information acquisition unit may acquire a parallax range which indicates a difference between the near side maximum parallax amount and the far side maximum parallax amount of the inputted multi-viewpoint image, and if the acquired parallax range exceeds a specified threshold, the number-of-viewpoint determination unit may increase the number of viewpoints of the stereoscopic image which is printed on the lenticular lens sheet as compared with a case where the acquired parallax range is within the specified threshold.

More specifically, parallax amounts of an object image taken at a short distance and a secondary object image taken at a long distance have conventionally been beyond display capability, which caused failures such as blurred and broken images. In the present aspect, it becomes possible to solve this problem by increasing the number of viewpoints in accordance with the parallax range (the range in parallax amount).

One aspect of the presently disclosed subject matter may further include sheet selection unit configured to select one lenticular lens sheet from lenticular lens sheets of a plurality of sheet types different in lens intervals, the one lenticular lens sheet being selected based on the number of viewpoints determined by the number-of-viewpoint determination unit.

One aspect of the presently disclosed subject matter further provides a stereoscopic image printing device including: image input unit configured to input a multi-viewpoint image with two or more viewpoints; information acquisition unit configured to acquire information on distribution of parallax of the inputted multi-viewpoint image; sheet selection unit configured to select one lenticular lens sheet from lenticular lens sheets of a plurality of sheet types different in lens intervals, the one lenticular lens sheet being selected based on the information on the distribution of parallax acquired by the information acquisition unit; and printing unit configured to print a stereoscopic image including the inputted multi-viewpoint image on the lenticular lens sheet selected by the sheet selection unit.

More specifically, a lenticular lens sheet in accordance with the parallax distribution of the inputted multi-viewpoint image is selected from lenticular lens sheets of a plurality of sheet types different in lens intervals.

In one aspect of the presently disclosed subject matter, the information acquisition unit may acquire information indicating at least one frequency, out of a frequency of a parallax amount which exceeds a first threshold on a near side and a frequency of a parallax amount which exceeds a second threshold on a far side among parallax amounts of the inputted multi-viewpoint image, and if the acquired frequency of the parallax amount which exceeds the first threshold exceeds a third threshold, or if the acquired frequency of the parallax amount which exceeds the second threshold exceeds a fourth threshold, the sheet selection unit may select a lenticular lens sheet of a sheet type having larger lens intervals as compared with a case where they are within the third threshold or the fourth threshold.

More specifically, parallax amounts of an object image taken at a short distance and a secondary object image taken at a long distance have conventionally been beyond display capability, which caused failures such as blurred and broken images. In the present aspect, it becomes possible to solve this problem by appropriately selecting the sheet in accordance with the frequency of the parallax amount.

In one aspect of the presently disclosed subject matter, the information acquisition unit may acquire information which indicates at least one maximum parallax amount out of near side and far side maximum parallax amounts among the parallax amounts of the inputted multi-viewpoint image, and if the acquired maximum parallax amount exceeds a specified threshold, the sheet selection unit may select a lenticular lens sheet of a sheet type having larger lens intervals as compared with a case where the acquired maximum parallax amount is within the specified threshold.

More specifically, parallax amounts of an object image taken at a short distance and a secondary object image taken at a long distance have conventionally been beyond display capability, which caused failures such as blurred and broken images. In the present aspect, it becomes possible to solve this problem by appropriately selecting the sheet in accordance with the maximum parallax amount.

In one aspect of the presently disclosed subject matter, the information acquisition unit may acquire a parallax range which indicates a difference between the near side maximum parallax amount and the far side maximum parallax amount of the inputted multi-viewpoint image, and if the acquired parallax range exceeds a specified threshold, the sheet selection unit may select a lenticular lens sheet of a sheet type having larger lens intervals as compared with a case where the acquired parallax range is within the specified threshold.

More specifically, parallax amounts of an object image taken at a short distance and a secondary object image taken at a long distance have conventionally been beyond display capability, which caused failures such as blurred and broken images. In the present aspect, it becomes possible to solve this problem by appropriately selecting the sheet in accordance with the parallax range (the range in parallax amount).

One aspect of the presently disclosed subject matter may include viewpoint image generation unit configured to generate, if the number of viewpoints of the multi-viewpoint image inputted via the image input unit is smaller than the number of viewpoints of the stereoscopic image which is printed on the selected lenticular lens sheet, a shortfall viewpoint image based on the inputted multi-viewpoint image.

It is to be noted that the shortfall viewpoint image may be generated so as to be interpolated between viewpoint images of the inputted multi-viewpoint image and may be generated so as to be extrapolated outside the viewpoint images of the inputted multi-viewpoint image.

In one aspect of the presently disclosed subject matter, the information acquisition unit may include: corresponding point detection unit configured to detect corresponding points where a left-end viewpoint image and a right-end viewpoint image in the inputted multi-viewpoint image have matching characteristics; and parallax amount calculation unit configured to calculate a parallax amount between the left-end viewpoint image and the right-end viewpoint image based on the corresponding points detected by the corresponding point detection unit, and the information acquisition unit may acquire information on the distribution of parallax of the inputted multi-viewpoint image based on the parallax amount calculated by the parallax amount calculation unit.

That is, information on distribution of parallax is acquired from the inputted multi-viewpoint image. Accordingly, even if special information is not pre-stored together with a stereoscopic image, a lens sheet suitable for distribution of parallax of the inputted image is selected.

In one aspect of the presently disclosed subject matter, the image input unit may acquire an image file which stores the multi-viewpoint image together with attribute information, and the information acquisition unit may acquire information on the distribution of parallax of the inputted multi-viewpoint image from the attribute information in the image file.

In one aspect of the presently disclosed subject matter, the printing unit may be configured to print on the lenticular lens sheet a stereoscopic image at a peak resolution of the printing unit, and the printing unit prints the stereoscopic image with the number of viewpoints in proportion to the lens intervals of the lenticular lens sheet.

That is, the stereoscopic image with the number of viewpoints proportional to the lens intervals is printed. Accordingly, even when the sheet type is varied in accordance with the parallax amount, an easy-to-see stereoscopic image can constantly be printed.

One aspect of the presently disclosed subject matter may further include: display unit configured to display a plane image; image processing unit configured to convert resolution of respective viewpoint images of the stereoscopic image which is printed on the lenticular lens sheet or to perform deformation processing on the respective viewpoint images in accordance with the lens intervals of the lenticular lens sheet; and display control unit configured to sequentially and repeatedly display on the display unit the respective viewpoint images processed by the image processing unit to display moving images.

One aspect of the presently disclosed subject matter may further include: display unit configured to display a plane image; virtual viewpoint image generation unit configured to generate a viewpoint image of a virtual viewpoint from two adjacent viewpoint images out of the stereoscopic image with n viewpoints (n being an integer of 3 or larger) which is printed on the lenticular lens sheet; image processing unit configured to convert resolution of respective viewpoint images in the stereoscopic image for display, which includes the two viewpoint images and the generated viewpoint image of the virtual viewpoint, or to perform deformation processing on the respective viewpoint images; and display control unit configured to sequentially and repeatedly display on the display unit the respective viewpoint images processed by the image processing unit to display moving images.

In one aspect of the presently disclosed subject matter, the image processing unit may perform image processing on the respective viewpoint images in accordance with the lens intervals and lens shapes of the lenticular lens sheet, so that portions of the respective viewpoint images which correspond to peaks of the lenticular lenses are made lighter and portions which correspond to troughs are made darker.

That is, it becomes possible to confirm by simulation display before printing in advance how different stereoscopic images look depending on the lens intervals and lens shapes.

In one aspect of the presently disclosed subject matter, the image processing unit may lower the resolution of the respective viewpoint images as the lens intervals of the lenticular lens sheet are larger.

In one aspect of the presently disclosed subject matter, the display control unit may conform display sizes of the respective viewpoint images which are displayed on the display unit to a print size of the stereoscopic image which is printed on the lenticular lens sheet.

One aspect of the presently disclosed subject matter may further include type change unit configured to change the sheet type of the lenticular lens sheet by hand, wherein when the sheet type of the lenticular lens sheet is changed by the type change unit, the printing unit may print the stereoscopic image on the changed lenticular lens sheet.

According to the presently disclosed subject matter, it becomes possible to form a stereoscopic image which is adaptable to parallax between inputted images on a lenticular lens sheet.

BRIEF DESCRIPTION OF THE DRAWINGS

FIG. 3B is an explanatory view used for explaining sheet selection (formation of four viewpoints);

FIG. 4 is a flow chart illustrating the flow of a stereoscopic image printing process in a first example;

FIG. 16A is an explanatory view used for explaining generating process of a confirmation image in the second embodiment (type A)

DETAILED DESCRIPTION OF THE EMBODIMENTS

Hereinafter, embodiments of the presently disclosed subject matter are described in detail with reference to the accompanying drawings.

<First Embodiment>

Figure 1:
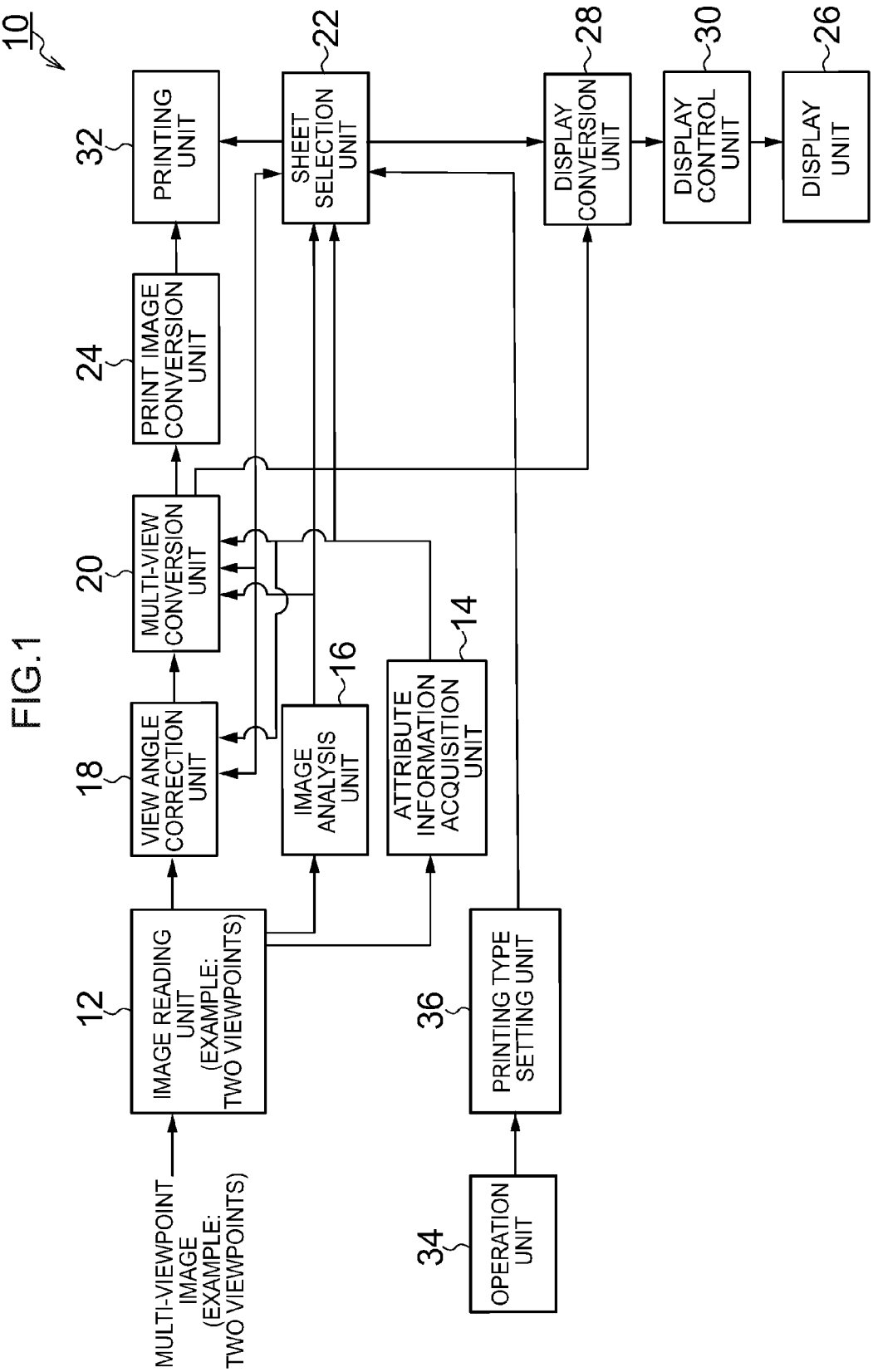
FIG. 1 is a block diagram illustrating an overall configuration of one example of a stereoscopic image printing device.

FIG. 1 is a block diagram illustrating an overall configuration of one example of a stereoscopic image printing device in a first embodiment.

A stereoscopic image printing device 10 of FIG. 1 includes an image reading unit 12, an attribute information acquisition unit 14, an image analysis unit 16, a view angle correction unit 18, a multi-view conversion unit 20, a sheet selection unit 22, a print image conversion unit 24, a display unit 26, a display conversion unit 28, a display control unit 30, a printing unit 32, an operation unit 34, and a setting unit (printing type setting unit) 36.

The image reading unit 12 (image input unit) inputs a stereoscopic image including a multi-viewpoint image. The multi-viewpoint image may be an image viewed from a plurality of viewpoints that is two or more viewpoints (a plurality of viewpoint images), and the multi-viewpoint image may be a plurality of picked-up images picked up from a plurality of real viewpoints, may be a plurality of virtual images as viewed from a plurality of virtual viewpoints, or may be a combination of a picked-up image and a virtual image. The image reading unit 12 in this example reads and thereby acquires an image file, which stores a stereoscopic image together with attribute information, from a record medium such as a memory card. It is to be noted that a mode for acquiring the image file is not limited, and the image file may be acquired, for example, by communication.

The attribute information acquisition unit 14 acquires the attribute information of a stereoscopic image inputted via the image reading unit 12.

The image analysis unit 16 analyzes the multi-viewpoint image (stereoscopic image) inputted via the image reading unit 12 to acquire information on distribution of parallax of the inputted multi-viewpoint image (hereinafter referred to as "parallax distribution information").

Figure 2:
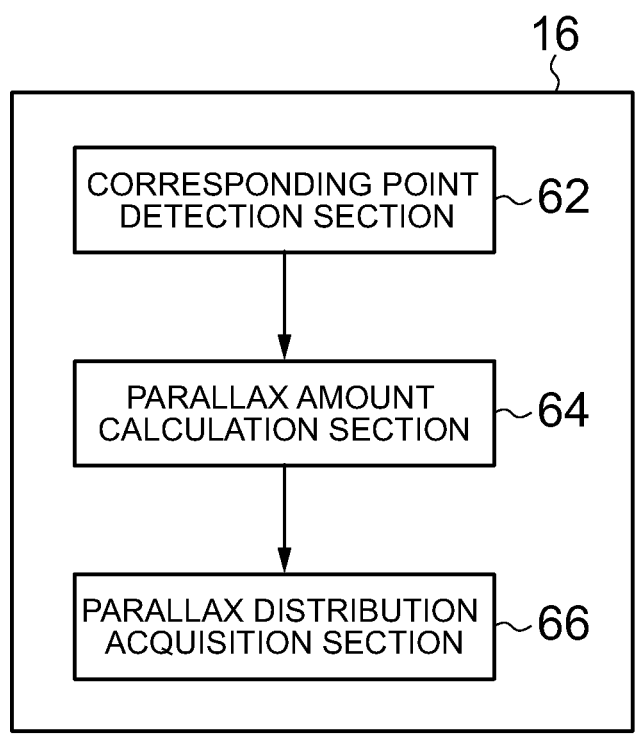
FIG. 2 is a detailed block diagram of an image analysis unit.

The image analysis unit 16 in this example includes a corresponding point detection section 62, a parallax amount calculation section 64, and a parallax distribution acquisition section 66 as illustrated in FIG. 2. The corresponding point detection section 62 detects corresponding points where a left-end viewpoint image (left eye image in this example) and a right-end viewpoint image (right eye image in this example) out of the stereoscopic image (two viewpoint images in this example) inputted via the image reading unit 12 have matching characteristics. The parallax amount calculation section 64 calculates a parallax amount at every corresponding point (or every pixel) between the left-end viewpoint image and the right-end viewpoint image, based on the corresponding points detected by the corresponding point detection section 62. Based on the parallax amount at every corresponding point (or every pixel) calculated by the parallax amount calculation section 64, the parallax distribution acquisition section 66 calculates (acquires) parallax distribution information indicating distribution of the parallax amount in the stereoscopic image. Although the parallax amount calculation section 64 in this example calculates the parallax amount across the entire stereoscopic image, the section 64 may calculate only the parallax amount in a part of the pixels of the stereoscopic image. The parallax amount calculation section 64 may also calculate the parallax amount in every group of a plurality of pixels (in every pixel group).

Examples of the parallax distribution information (information on distribution of the parallax amount of the multi-viewpoint image) calculated by the parallax distribution acquisition section 66 in the image analysis unit 16 include parallax amount frequency information, maximum parallax amount information, and a parallax range. The parallax amount frequency information includes frequency of the parallax amount which exceeds a parallax amount threshold on a near side and a frequency of the parallax amount which exceeds a parallax amount threshold on a far side among the parallax amounts of an inputted stereoscopic image. The maximum parallax amount information includes a near side maximum parallax amount and a far side maximum parallax amount among the parallax amounts of the inputted stereoscopic image. The parallax range indicates a difference between the near side maximum parallax amount and the far side maximum parallax amount of the inputted stereoscopic image (a width of a parallax amount range).

The view angle correction unit 18 corrects a view angle of the stereoscopic image inputted via the image reading unit 12. The view angle correction unit 18 determines the number of viewpoints of a stereoscopic image for printing which is printed by the printing unit 32 on a lenticular lens sheet (hereinafter simply referred to as "a lens sheet").

The view angle correction unit 18 determines the number of viewpoints in various modes. In a first mode, the number of viewpoints of the stereoscopic image for printing, which is printed on a lens sheet, is determined based on the parallax distribution information acquired by the image analysis unit 16 (or the attribute information acquisition unit 14). In a second mode where a sheet type of the lens sheet is selected by the later-described sheet selection unit 22 based on the parallax distribution information, the number of viewpoints of the stereoscopic image for printing, which is printed on the lens sheet, is determined in accordance with lens intervals of the sheet type selected by the sheet selection unit 22. That is, the number of viewpoints of the stereoscopic image for printing may indirectly be determined based on the parallax distribution information.

The multi-view conversion unit 20 compares the number of viewpoints of the multi-viewpoint image (stereoscopic image) inputted via the image reading unit 12 and the number of viewpoints of the stereoscopic image for printing determined by the view angle correction unit 18. If the number of viewpoints of the inputted multi-viewpoint image is smaller, a shortfall viewpoint image (a supplement viewpoint image for printing) is generated from the inputted multi-viewpoint image. It is to be noted that the shortfall viewpoint image may be generated so as to be interpolated between viewpoint images which constitute the inputted stereoscopic image, and may also be generated so as to be extrapolated outside the viewpoint images which constitute the inputted stereoscopic image.

The sheet selection unit 22 selects one lens sheet from lens sheets of a plurality of sheet types different in lens intervals based on the parallax distribution information acquired by the image analysis unit 16 or the attribute information acquisition unit 14.

The sheet selection unit 22 may select a sheet according to various modes.

In a first mode, it has a function of selecting, if the number of viewpoints of the stereoscopic image for printing is determined based on the parallax distribution information in the view angle correction unit 18, a lens sheet based on the number of viewpoints of the stereoscopic image for printing determined by the view angle correction unit 18. When the resolution of the printing unit 32 is constant (for example, peak resolution of the printing unit 32), the sheet selection unit 22 selects a lens sheet with lens intervals proportional to the number of viewpoints. In the case where print resolution is changed in accordance with the number of viewpoints of the stereoscopic image for printing, a lens sheet is selected based on lens intervals, which correspond to the number of the viewpoints and the print resolution.

In a second mode, it has a function of selecting a lens sheet based on the parallax distribution information. The sheet selection unit 22 in this example has a function of selecting, if frequency of the parallax amount which exceeds the near side parallax amount threshold exceeds a specified threshold (a near side frequency threshold), or if frequency of the parallax amount which exceeds the far side parallax amount threshold exceeds a specified threshold (a far side frequency threshold), a lens sheet of a sheet type having larger lens intervals as compared with a case where the frequency of the parallax amount is within the frequency threshold. The sheet selection unit 22 in this example also has a function of selecting, if the near side maximum parallax amount or the far side maximum parallax amount exceeds a specified threshold (maximum parallax amount threshold), a lens sheet of a sheet type having larger lens intervals as compared with a case where the maximum parallax amount is within the threshold. The sheet selection unit 22 in this example also has a function of selecting, if a parallax range which indicates a difference between the near side maximum parallax amount and the far side maximum parallax amount exceeds a specified threshold (parallax range threshold), a lenticular lens sheet of a sheet type having larger lens intervals as compared with a case where the parallax range is within the parallax range threshold.

Figure 3A:
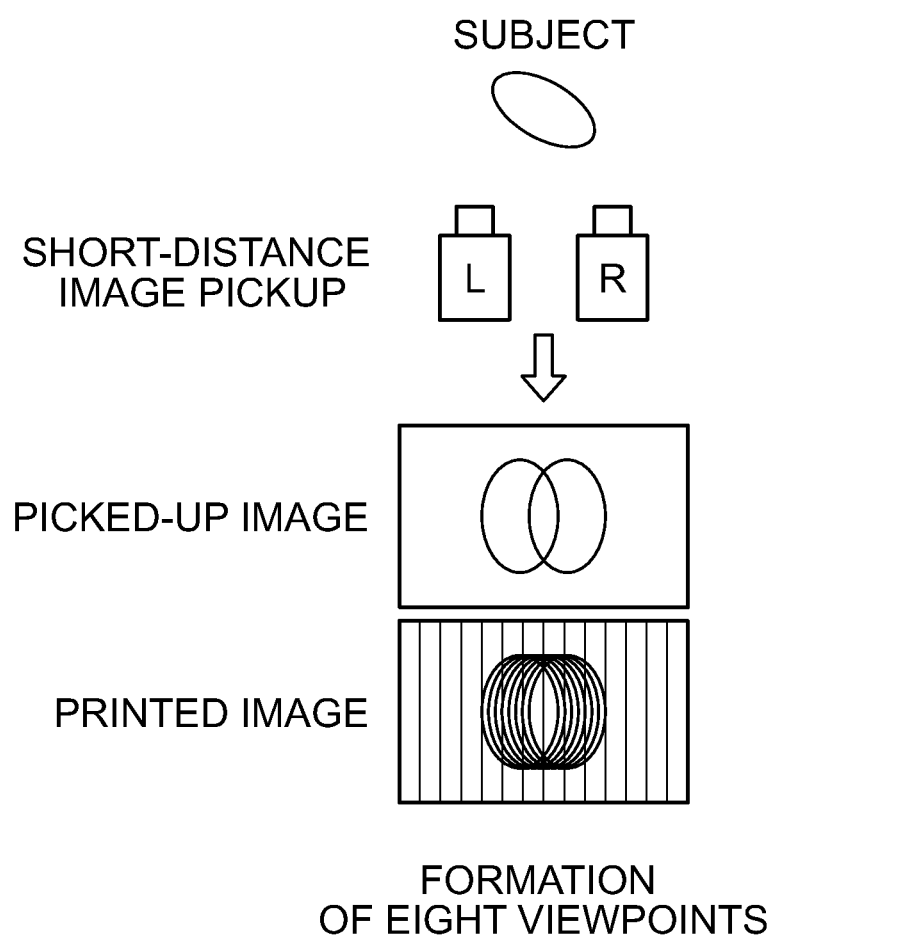
FIG. 3A is an explanatory view used for explaining sheet selection (formation of eight viewpoints)

In this example, in the case of a stereoscopic image picked up at a short-distance, a lens sheet of sheet type A illustrated in FIG. 3A is selected, whereas in the case of a stereoscopic image picked up at a middle to long distance, a lens sheet of sheet type B illustrated in FIG. 3B is selected. The sheet type A has lens intervals (pitches) of 50 LPI (line per inch) and eight viewpoints. The sheet type B has lens intervals (pitches) of 100 LPI and four viewpoints. However, the number of sheet types and their lens interval are not particularly limited.

The display unit 26 includes a display device (such as a liquid crystal display device) which displays a plane image.

The display conversion unit 28 converts resolution of viewpoint images for printing, which are printed on the lens sheet selected by the sheet selection unit 22, in accordance with lens intervals of the lens sheet, and generates a stereoscopic image for display. More specifically, if a lens sheet with larger lens intervals is selected by the sheet selection unit 22, the display conversion unit 28 lowers the resolution of the respective viewpoint images for printing as compared with a case where a lens sheet with smaller lens intervals is selected.

The display conversion unit 28 also performs deformation processing on the respective viewpoint images for display in accordance with the lens intervals of the lens sheet selected by the sheet selection unit 22.

For example, in accordance with the lens intervals and lens shapes of the lens sheet selected by the sheet selection unit 22, the display conversion unit 28 performs image processing on the viewpoint images for display, so that portions of the respective viewpoint images for display, which are printed on peaks of the lenticular lenses, are made lighter and portions which are printed on troughs are made darker. Vertical line images may be inserted into the respective viewpoint images for display in accordance with the lens intervals.

The display control unit 30 sequentially and repeatedly displays, on the display unit 26, the viewpoint images for display (confirmation images), which were generated from viewpoint images for printing through the image processing by the display conversion unit 28, to achieve display of moving images on the display unit 26.

At the time of displaying on the display unit 26, the display control unit 30 conforms display sizes of the viewpoint images for display to a print size of the stereoscopic image for printing which is printed on the lens sheet.

The printing unit 32 prints the stereoscopic image for printing, which includes a multi-viewpoint image inputted by the image reading unit 12, on the lens sheet selected by the sheet selection unit 22.

When a shortfall viewpoint image (supplement viewpoint image for printing) is generated by the multi-view conversion unit 20, the printing unit 32 in the present embodiment prints a stereoscopic image for printing, which includes the multi-viewpoint image inputted by the image reading unit 12 and the supplement viewpoint image for printing generated by the multi-view conversion unit 20, on the lens sheet. The printing unit 32 of this example prints on the selected lens sheet a stereoscopic image for printing at a peak resolution of the printing unit 32, that is, prints viewpoint images for printing having the number of viewpoints which is proportional to the lens intervals of the selected lens sheet.

The operation unit 34 receives an input of instruction by an operator.

The setting unit 36 (type change unit) changes the sheet type of the lens sheet selected by the sheet selection unit 22 in response to the input of instruction received in the operation unit 34. When the sheet type of the lens sheet is changed by the setting unit 36, the printing unit 32 prints the inputted stereoscopic image for printing on the changed lens sheet.

FIG. 4 is a flow chart illustrating one example (first example) of the flow of stereoscopic image printing process.

First, the image reading unit 12 reads and thereby acquires an image file, which stores a stereoscopic image including a multi-viewpoint image (two or more viewpoints images) together with attribute information, from a record medium or the like (step S2). In this example, a stereoscopic image which includes two viewpoint images (a left eye image and a right eye image) is inputted.

Next, the corresponding point detection section 62 in the image analysis unit 16 detects corresponding points where a left-end viewpoint image (left eye image in this example) and a right-end viewpoint image (right eye image in this example) out of the inputted multi-viewpoint image (stereoscopic image) have matching characteristics (step S4).

Next, the parallax amount calculation section 64 in the image analysis unit 16 acquires parallax distribution information of the inputted multi-viewpoint image (step S5). In step S5, a parallax amount at every corresponding point (or every pixel) between the left-end viewpoint image and the right-end viewpoint image is calculated based on the corresponding points detected in step S4, and the parallax distribution information on the stereoscopic image is calculated based on the calculated parallax amount.

Figure 5A:
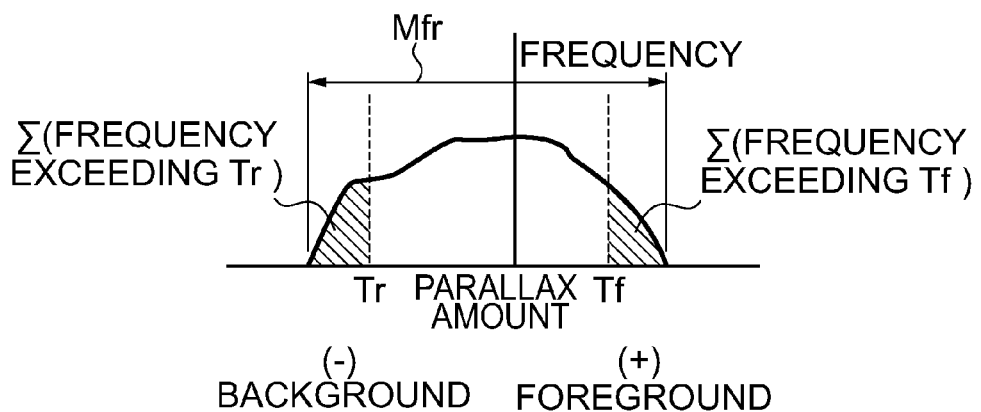
FIG. 5A is an explanatory view used for explaining parallax amount frequency information.
Figure 5B:
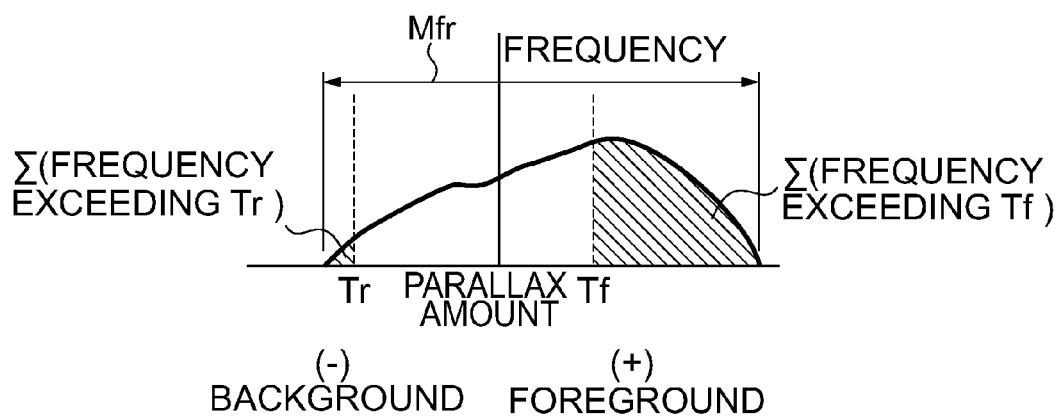
FIG. 5B is an explanatory view used for explaining parallax amount frequency information.

In this example, at least parallax amount frequency information as illustrated in FIGS. 5A and 5B is calculated as the parallax distribution information. In FIGS. 5A and 5B, the parallax amount is illustrated with a reference character. Reference character Tf designates a near side parallax amount threshold, while reference character Tr designates a far side parallax amount threshold. The parallax amount represents a depth directional position in the stereoscopic image of a subject on the near side (foreground side closer than a parallax amount zero point) if the reference character has a positive value, whereas the parallax amount represents a depth directional position in the stereoscopic image of the subject on the far side (background side further than the parallax amount zero point) if reference character has a negative value. The parallax distribution acquisition section 66 of this example calculates "Σ(frequency exceeding Tf)" on the near side, and "Σ(frequency exceeding Tr)" on the far side. Regions corresponding to the sum total of frequency are illustrated with slanting lines in FIGS. 5A and 5B. "Σ(frequency exceeding Tf)" is the sum total of frequency of the parallax amount which exceeds the near side parallax amount threshold Tf (i.e., the near side parallax amount whose absolute value is larger than Tf). "Σ(frequency exceeding Tr)" is the sum total of frequency of the parallax amount which exceeds the far side parallax amount threshold Tr (i.e., the far side parallax amount whose absolute value is larger than Tr). Hereinafter, "Σ(frequency exceeding Tf)" is referred to as "ΣTf", and "Σ(frequency exceeding Tr)" is referred to as "ΣTr."

Next, one lens sheet is selected from lens sheets of a plurality of sheet types different in lens intervals based on the parallax distribution information calculated in step S5 (steps S6 to S14).

In step S6, it is determined whether or not ΣTf exceeds frequency threshold V1, and in step S8, it is determined whether or not ΣTr exceeds frequency threshold V2.

If ΣTf exceeds frequency threshold V1 in step S6, or if ΣTr exceeds frequency threshold V2 in step S8, a lens sheet of sheet type A with larger lens intervals (pitches) is selected (step S12). In contrast, if ΣTf is equal to or less than frequency threshold V1 and ΣTr is equal to or less than frequency threshold V2, then a lens sheet of sheet type B with smaller lens intervals (pitches) is selected (step S14).

In this example, if the lens sheet of sheet type A is selected, the number of viewpoints of the stereoscopic image for printing is set to "8" (step S16), whereas if the lens sheet of sheet type B is selected, then the number of viewpoints of the stereoscopic image for printing is set to "4" (step S18). That is, the number of viewpoints of the stereoscopic image for printing is set to a value proportional to lens intervals of the lens sheet.

Although a description has been given of the example in which sheet selection is first conducted based on the information on distribution of parallax and then the number of viewpoints of the stereoscopic image for printing is determined based on the lens intervals of the selected lens sheet, the order of these operations may be reversed. That is, the number of viewpoints of the stereoscopic image for printing may be determined based on the information on distribution of parallax first, and then sheet selection may be performed based on the determined number of viewpoints.

Figure 6A:
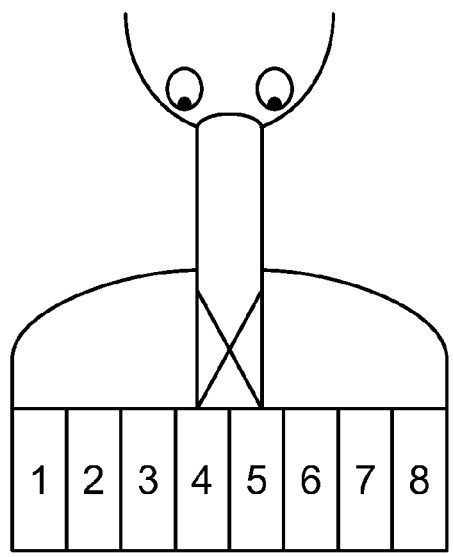
FIG. 6A is an explanatory view used for explaining lens intervals and multi-viewpoint formation (type A)
Figure 6B:
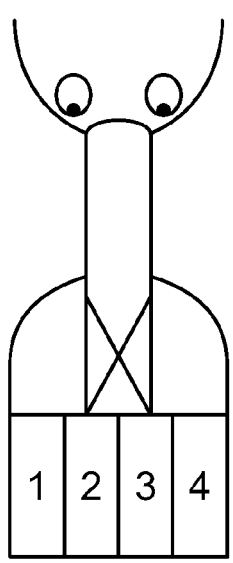
FIG. 6B is an explanatory view used for explaining lens intervals and multi-viewpoint formation (type B)

Next, the multi-view conversion unit 20 performs multi-viewpoint formation of the stereoscopic image inputted in step S2. More specifically, if the number of viewpoints of the stereoscopic image is smaller than the number of viewpoints of the stereoscopic image for printing which is printed on the lens sheet selected in steps S6 to S14, a shortfall viewpoint image (supplement viewpoint image for printing) is generated from the inputted stereoscopic image (step S20). For example, in the case where two viewpoint images are inputted and eight viewpoint images are expected to be printed as illustrated in FIG. 6A, shortfall six viewpoint images are inserted (interpolated or extrapolated) to form six supplement viewpoint images for printing, so that a stereoscopic image for printing with total eight viewpoints is obtained. In the case of printing four viewpoint images as illustrated in FIG. 6B, shortfall two viewpoint images are inserted (interpolated or extrapolated) to form two supplement viewpoint images for printing, so that a stereoscopic image for printing with total four viewpoints is obtained.

Thus, in the case of picking up a short-distance image, the parallax amount may become excessively large, and a lens sheet with larger lens intervals (sheet type A in this example) than normal-size sheets is selected, so that a stereoscopic image for printing with a larger number of viewpoints (eight viewpoints in this example) is generated. In contrast, in the case of picking up a middle to long-distance image, the parallax amount is less likely to become excessively large, and a general lens sheet (sheet type B in this example) is selected, and a stereoscopic image for printing with a smaller number of viewpoints (four viewpoints in this example) is generated.

Next, the display control unit 30 generates a viewpoint image for display (confirmation image) and displays the viewpoint image on the display unit 26 (step S22). It is determined whether or not an input of confirmation by an operator was received in the operation unit 34 (step S24), and if the sheet type of the selected lens sheet is changed by hand, the sheet type of the lens sheet is changed to the sheet type received in the operation unit 34 (step S26), and then the procedure proceeds to step S22.

If the input of confirmation by the operator was received in step S24, the stereoscopic image for printing which includes a multi-viewpoint image is printed on the lens sheet selected in steps S6 to S14 (step S28). More specifically, if the sheet type is not changed in step S26, the stereoscopic image for printing is printed on the lens sheet selected by the sheet selection unit 22 in steps S6 to S14, whereas if the sheet type is manually changed in step S26, the stereoscopic image for printing is printed on the changed lens sheet.

Figure 7:
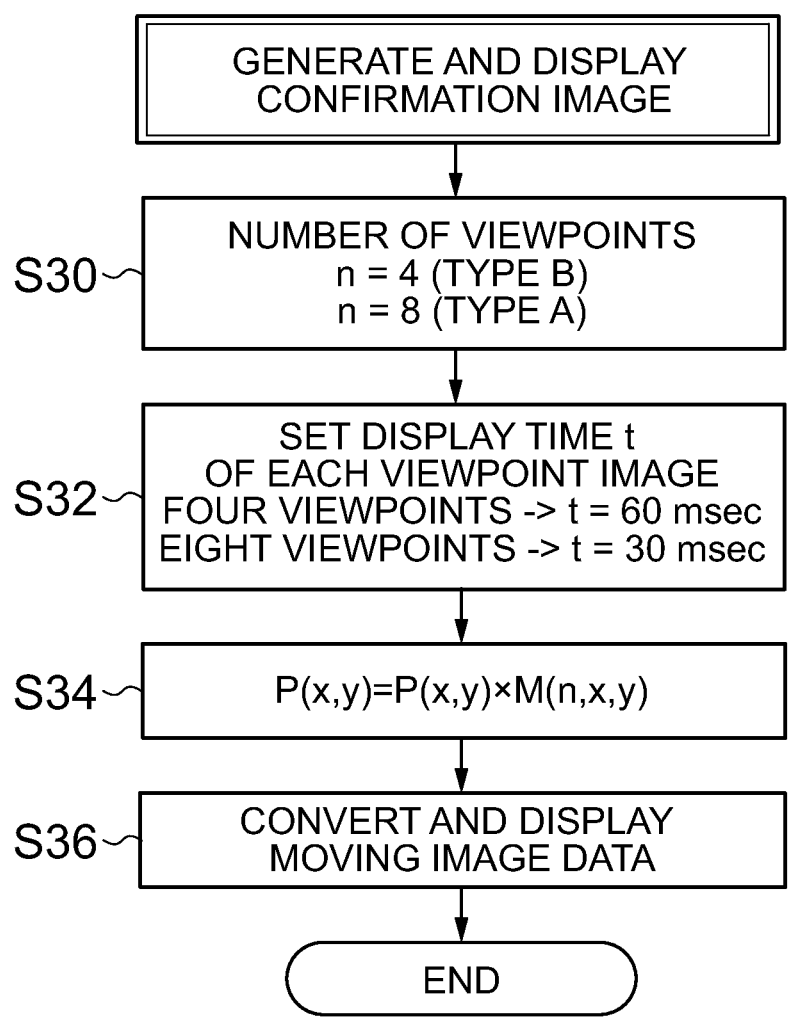
FIG. 7 is a flow chart illustrating one example of generation and display process of a confirmation image in a first embodiment.

FIG. 7 is a flow chart illustrating one example of generation and display process of the confirmation image in the first embodiment (step S22 in FIG. 4). The confirmation image is an image displayed on the display unit 26 to confirm by simulation how the stereoscopic image looks on the lens sheet. The confirmation image is generated by converting the stereoscopic image for printing to a moving image including plane images through image processing in the display conversion unit 28. This conversion process includes a moving image formation process for confirming the multi-viewpoint image that forms the stereoscopic image for printing in the form of plane display, and a simulation conversion process for simulating how different an image looks depending on different sheet types.

First, the display conversion unit 28 acquires the number of viewpoints of the stereoscopic image for printing, which was set in steps S16 to S18, based on the sheet type (step S30). In this example, if the sheet type is B, the number of viewpoints is set to "4", whereas if the sheet type is A, the number of viewpoints is set to "8".

Next, the display control unit 30 sets display time t of the respective viewpoint images for display (step S32). When a display repeating cycle during moving image formation is set to 240 msec, display time t for four viewpoints is set to 60 msec, and display time t for eight viewpoints is set to 30 msec. As a consequence, in the case of the sheet type A with larger lens intervals, the display time of the respective viewpoint images for display is made shorter than that in the case of the sheet type B with smaller lens intervals, so that the display time taken for displaying all the viewpoint images for display is equalized.

Figure 8:
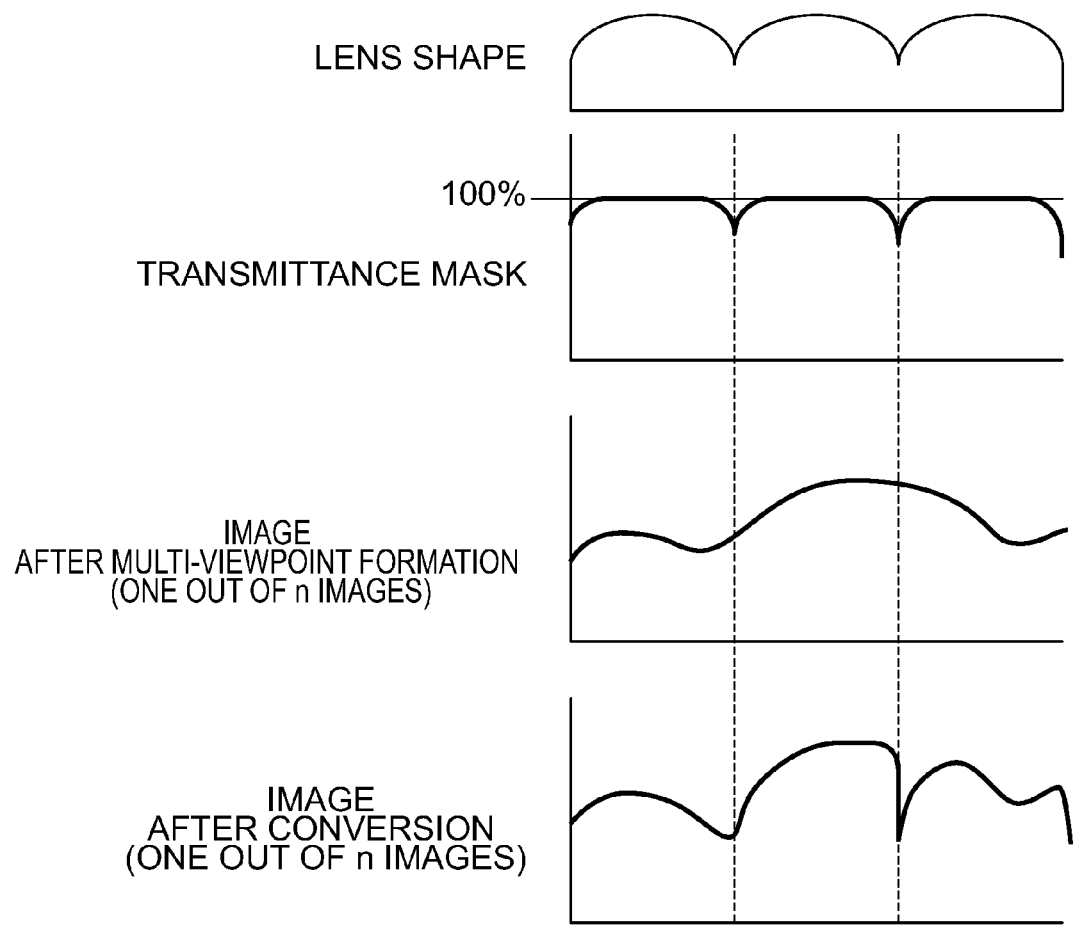
FIG. 8 is an explanatory view used for explaining an image processing example to simulate how a stereoscopic image looks.

Next, the display conversion unit 28 performs specified image processing on the viewpoint images for printing to produce viewpoint images for display. Deformation processing is performed on each viewpoint image for printing in accordance with the lens intervals of the lens sheet selected in steps S6 to S14 (step S34). When P (x, y) represents a pixel of a display image at coordinates (x, y), and M (n, x, y) represents a transmittance mask of every sheet type n, P(x, y)=P(x, y)×M(n, x, y) is calculated. For example, with use of a transmittance mask, image processing (transmittance conversion) is performed in accordance with the lens intervals and lens shapes of the selected lens sheet as illustrated in FIG. 8, so that portions of each viewpoint image for display, which correspond to peaks of the lenticular lenses, are made lighter and portions, which correspond to troughs, are made darker. This makes it possible to visually confirm the trough portions of the lenticular lenses. That is, image processing (deformation processing) is performed so as to simulate how the stereoscopic image looks through the lenticular lenses on the display unit 26.

Next, the display control unit 30 sequentially and repeatedly displays the respective viewpoint images for display, which were generated by deformation processing, on the display unit 26 to display moving images (step S36). For example, in the case of the lens sheet of sheet type A illustrated in FIG. 6A, viewpoint images are displayed in order from the first viewpoint image to the eighth viewpoint image, one viewpoint image being switched to the next viewpoint image in 30 msec, and then the viewpoint images are displayed in order from the seventh viewpoint image to the first viewpoint image, one viewpoint image being switched to the next viewpoint image in 30 msec, and this procedure is followed by repetition of the same display procedure. In the case of the lens sheet of sheet type B illustrated in FIG. 6B, viewpoint images are displayed in order from the first viewpoint image to the fourth viewpoint image, one viewpoint image being switched to the next viewpoint image in 60 msec, and then the viewpoint images are displayed in order from the third viewpoint image to the first viewpoint image, one viewpoint image being switched to the next viewpoint image in 60 msec, and this procedure is followed by repetition of the same display procedure.

Figure 9:
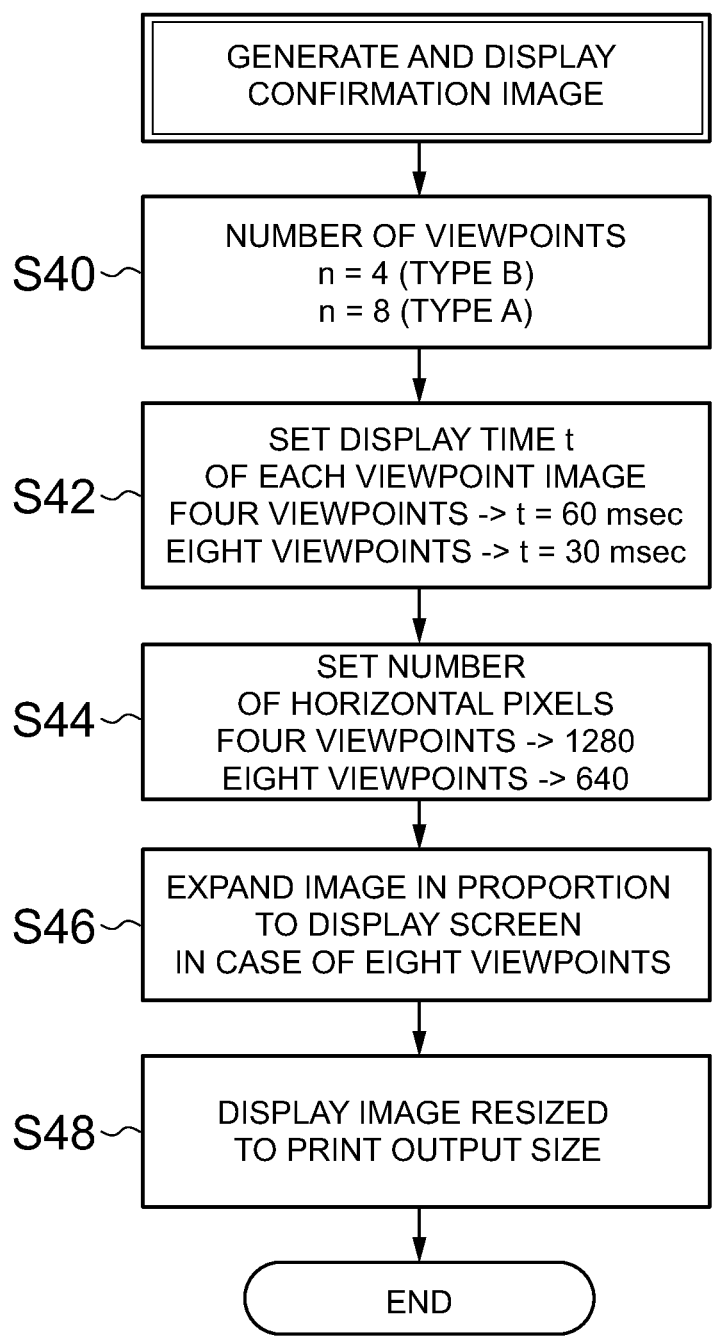
FIG. 9 is a flow chart illustrating another example of generation and display process of a confirmation image in the first embodiment.

FIG. 9 is a flow chart illustrating another example of generation and display process of a confirmation image in the first embodiment (step S22 in FIG. 4).

Steps S40 to 42 are similar to steps S30 to 32 in FIG. 7.

Next, the display conversion unit 28 performs specified image processing on the viewpoint images for printing to produce viewpoint images for display. First, resolution of the respective viewpoint images, which are printed on the lens sheet selected in steps S6 to S14, is converted in accordance with the lens intervals of the lens sheet (step S44). For example, the number of horizontal pixels is set to 1280 in the case of four viewpoints, and the number of horizontal pixels is set to 640 in the case of eight viewpoints. As a consequence, when the sheet type A with larger lens intervals is selected, the resolution of the respective viewpoint images is lowered as compared with the case where the sheet type B with smaller lens intervals is selected.

Next, in the case of the maximum viewpoints (eight viewpoints in this example), the display conversion unit 28 expands the respective viewpoint images in accordance with the display size in the display unit 26 (step S46). That is, the respective viewpoint images are resized so that their display sizes in the display unit 26 may become identical.

Then, the display conversion unit 28 resizes the display size of the respective viewpoint images displayed on the display unit 26 to be identical to the print size (print output size) of the stereoscopic image which is printed on the lens sheet, and displays the resized respective viewpoint images on the display unit 26 (step S48). More specifically, the multi-viewpoint image is resized so as to conform the display size of the stereoscopic image, which is displayed on the display unit 26, to the size of the stereoscopic image which is printed on the lens sheet. As a result, viewpoint images for display are generated. Then, the display control unit 30 sequentially and repeatedly displays the respective viewpoint images for display on the display unit 26 so as to display moving images.

Although a description has been given of the case (first example) where a lens sheet is selected in accordance with parallax amount frequency information as an example, the presently disclosed subject matter is not limited to such a case. A description is hereinafter given of the case (second example) where a sheet is selected in accordance with maximum parallax amount information and a case (third example) where a sheet is selected in accordance with a parallax range.

Figure 10:
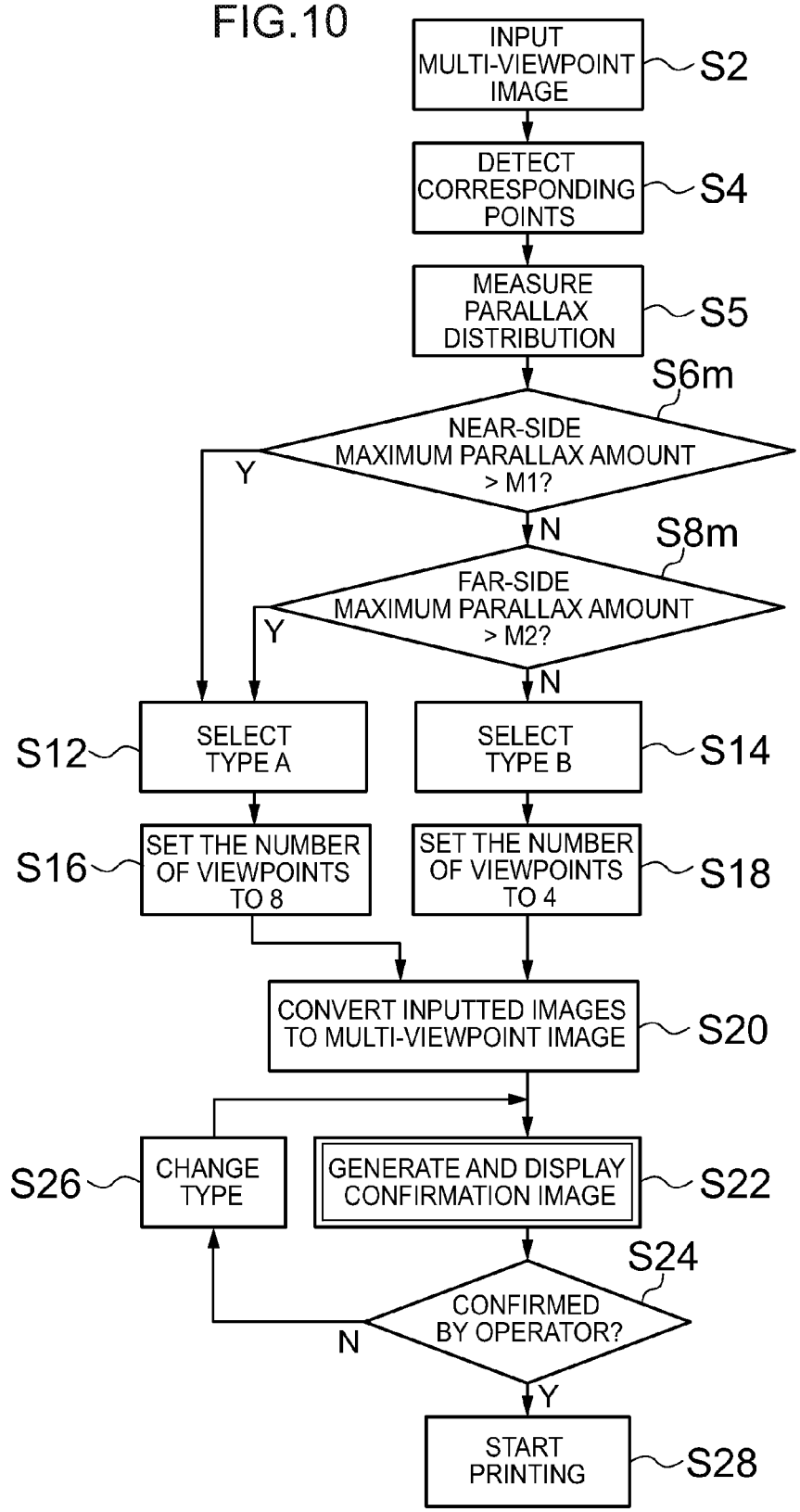
FIG. 10 is a flow chart illustrating the flow of the stereoscopic image printing process in a second example.

FIG. 10 is a flow chart illustrating one example of the flow of the printing process of a stereoscopic image involving sheet selection in the second example.

Steps S2 to S5 are similar to the first example of FIG. 4. In this example, in step S5, at least maximum parallax amount information is calculated as the parallax distribution information.

In the second example, if the near side maximum parallax amount (maximum value of parallax amounts on the foreground side in FIGS. 5A and 5B) exceeds specified threshold M1 in step S6$m$, or if the far side maximum parallax amount (maximum value of parallax amounts on the background side in FIGS. 5A and 5B) exceeds specified threshold M2 in step S8$m$, a lens sheet of sheet type A with larger lens intervals (pitches) is selected (step S12). In contrast, if the near side maximum parallax amount is equal to or less than M1 and the far side maximum parallax amount is equal to or less than threshold M2, a lens sheet of sheet type B with smaller lens intervals (pitches) is selected (step S14). Steps S16 to S28 are similar to the first example of FIG. 4.

Figure 11:
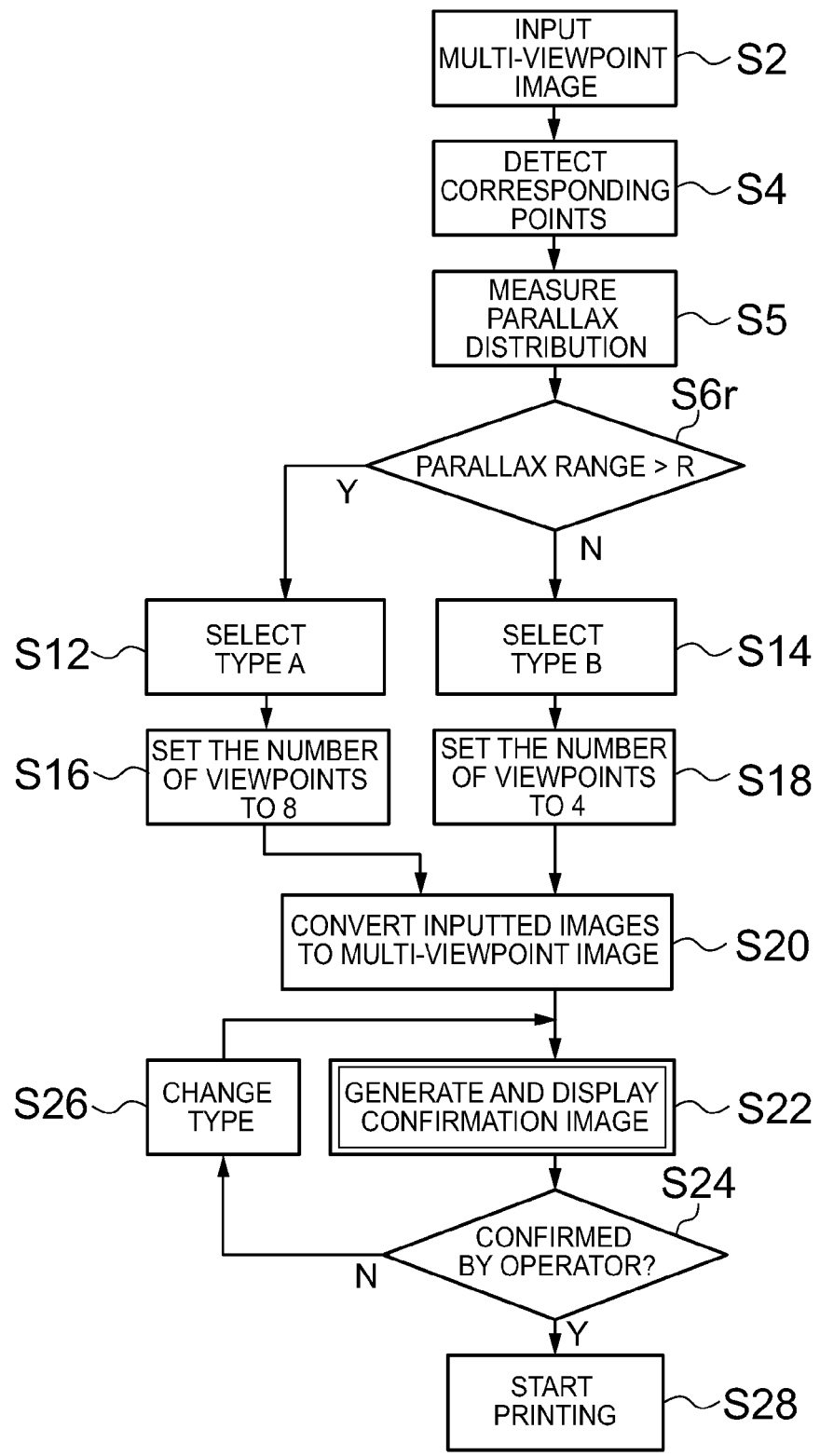
FIG. 11 is a flow chart illustrating the flow of the stereoscopic image printing process in a third example.

FIG. 11 is a flow chart illustrating one example of the flow of the printing process of a stereoscopic image involving sheet selection in the third example.

Steps S2 to S5 are similar to the first example of FIG. 4. In this example, in step S5, at least a parallax range is calculated as the parallax distribution information.

In the third example, if a parallax range (Mfr in FIGS. 5A and 5B) which indicates a difference between the near side maximum parallax amount and the far side maximum parallax amount of the stereoscopic image exceeds specified threshold R in step S6$r$, a lens sheet of sheet type A with larger lens intervals (pitches) is selected (step S12). In contrast, if parallax range Mfr is equal to or less than threshold R, a lens sheet of sheet type B with smaller lens intervals (pitches) is selected (step S14). Steps S16 to S28 are similar to the first example of FIG. 4.

Hereinafter, a description is given of the case (fourth example) where maximum parallax amount information is acquired from the attribute information in the image file and a sheet is selected in accordance with the maximum parallax amount information, and the case (fifth example) where a parallax range is acquired from the attribute information in the image file and a sheet is selected in accordance with the parallax range.

Figure 12:
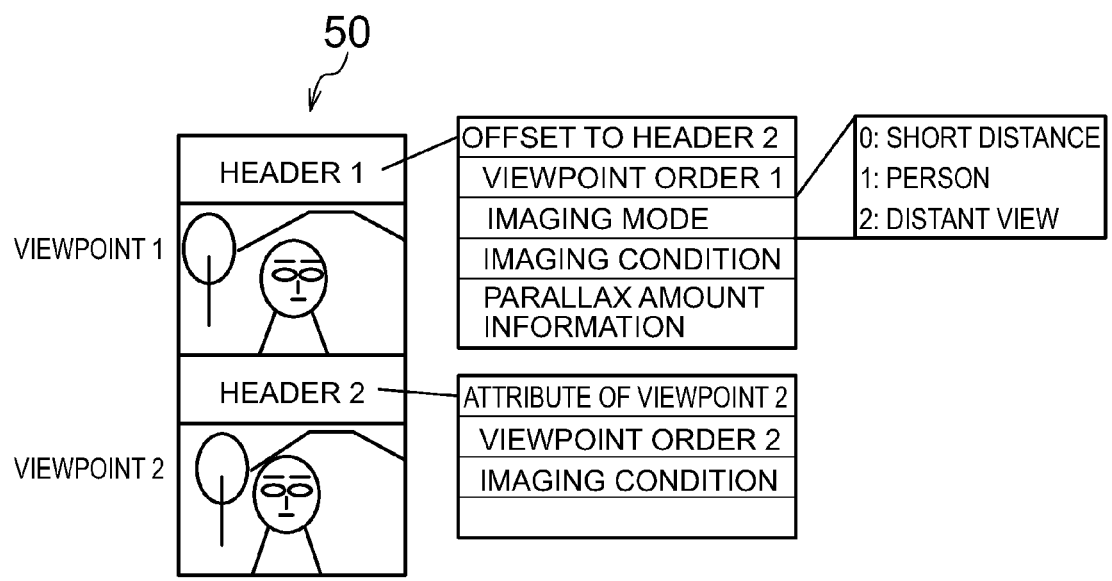
FIG. 12 is an explanatory view illustrating one example of attribute information of a stereoscopic image.

FIG. 12 illustrates one example of an image file having: a stereoscopic image including images with viewpoints 1 and 2 (a left eye image and a right eye image); and attribute information of the image with viewpoint 1 (header section 1) and attribute information of the image with viewpoint 2 (header section 2). Once the image reading unit 12 acquires an image file 50 of FIG. 12, the attribute information acquisition unit 14 acquires parallax amount information in the attribute information. The parallax amount information in the present example includes information on parallax distribution of the image with viewpoint 1 and the image with viewpoint 2 (parallax distribution information).

Figure 13:
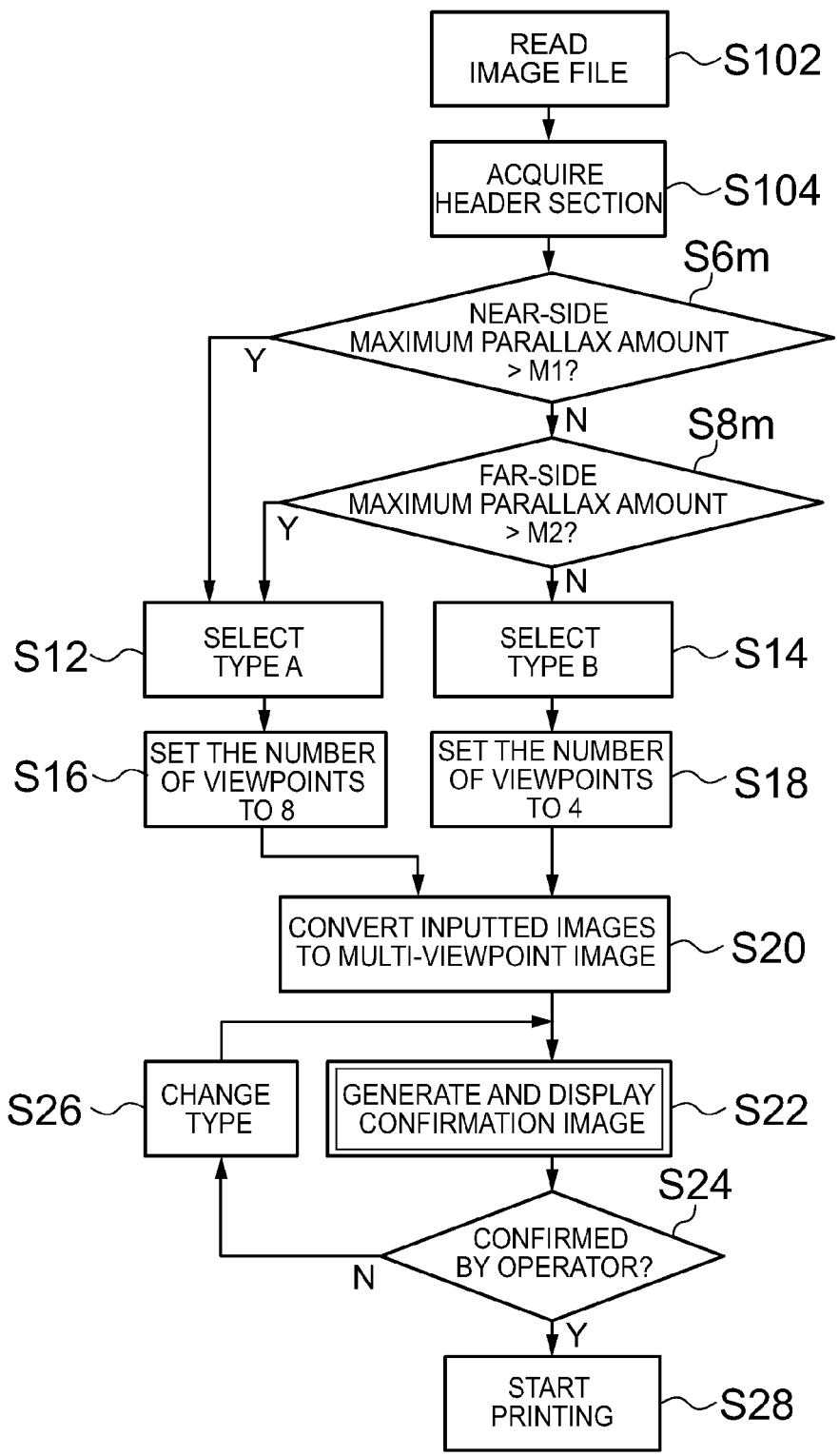
FIG. 13 is a flow chart illustrating the flow of the stereoscopic image printing process in a fourth example.

FIG. 13 is a flow chart illustrating one example of the flow of the printing process of a stereoscopic image involving sheet selection in the fourth example.

First, the image reading unit 12 reads and thereby acquires the image file of FIG. 12 from a record medium or the like (step S102).

Next, the attribute information acquisition unit 14 acquires attribute information (header section) from the image file (step S104). In this example, in step S102, at least a near side maximum parallax amount and a far side maximum parallax amount are acquired from the attribute information.

In the fourth example, if the near side maximum parallax amount (maximum value of parallax amounts on the foreground side in FIGS. 5A and 5B) exceeds specified threshold M1 in step S6$m$, or if the far side maximum parallax amount (maximum value of parallax amounts on the background side in FIGS. 5A and 5B) exceeds specified threshold M2 in step S8$m$, a lens sheet of sheet type A with larger lens intervals (pitches) is selected (step S12). In contrast, if the near side maximum parallax amount is equal to or less than M1 and the far side maximum parallax amount is equal to or less than threshold M2, a lens sheet of sheet type B with smaller lens intervals (pitches) is selected (step S14). Steps S16 to S28 are similar to the first example of FIG. 4.

Figure 14:
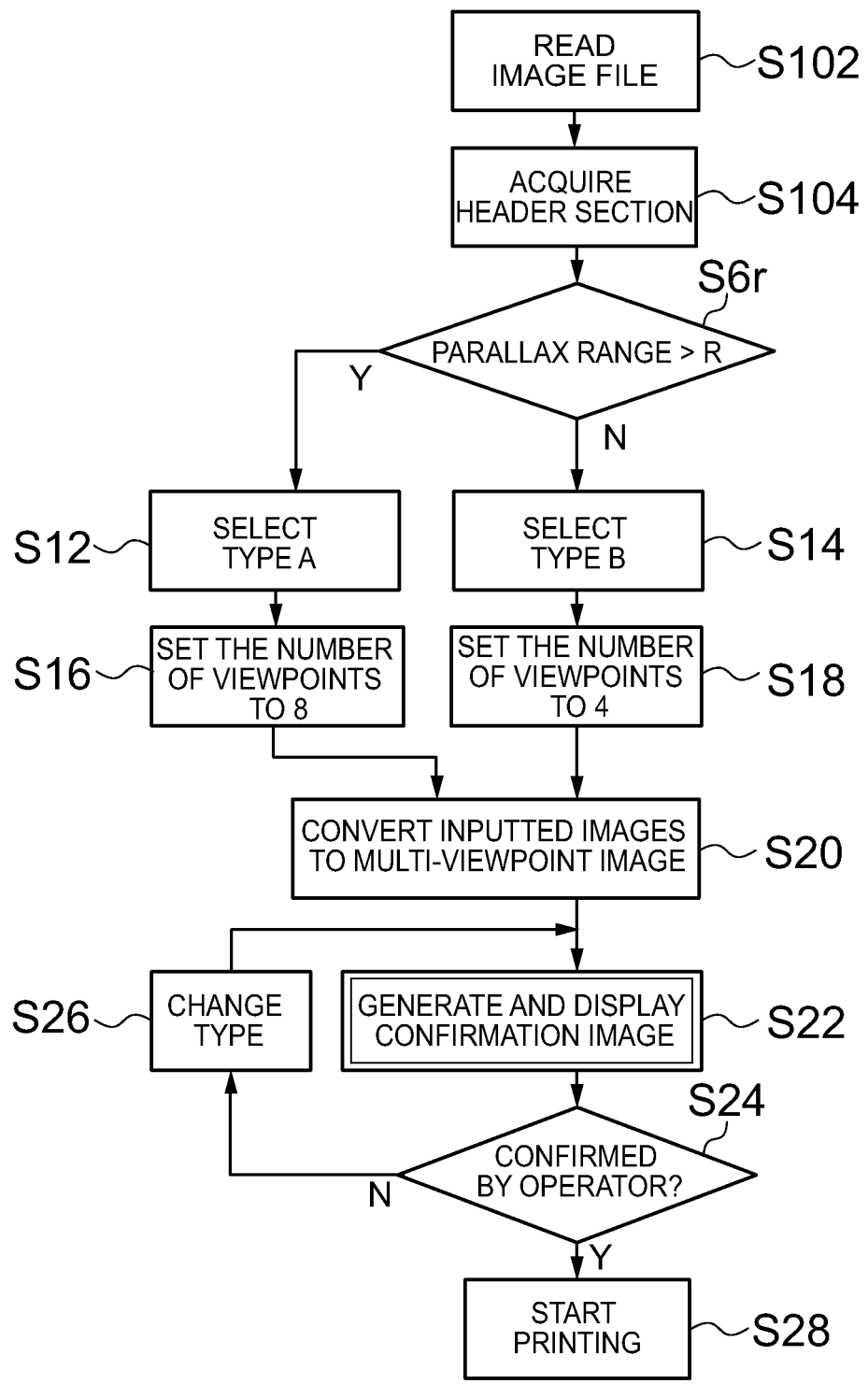
FIG. 14 is a flow chart illustrating the flow of the stereoscopic image printing process in a fifth example.

FIG. 14 is a flow chart illustrating one example of the flow of the printing process of a stereoscopic image involving sheet selection in the fifth example.

Steps S102 to S104 are similar to the fourth example of FIG. 13. In this example, in step S104, at least a parallax range which indicates a difference between the near side maximum parallax amount and the far side maximum parallax amount is acquired from the attribute information.

In the fifth example, if the parallax range (Mfr in FIGS. 5A and 5B) is more than specified threshold R in step S6r, a lens sheet of sheet type A with larger lens intervals (pitches) is selected (step S12). In contrast, if parallax range Mfr is equal to or less than threshold R, a lens sheet of sheet type B with smaller lens intervals (pitches) is selected (step S14). Steps S16 to S28 are similar to the first example of FIG. 4.

<Second Embodiment>

A description is now given of a stereoscopic image printing device in a second embodiment. Hereinafter, only different points from the first embodiment are explained.

An overall configuration of the stereoscopic image printing device in the present embodiment includes the same component members as those in the stereoscopic image printing device in the first embodiment explained with reference to FIG. 1. However, the display conversion unit 28 in the present embodiment generates a virtual viewpoint image from two adjacent viewpoint images for printing (two viewpoint images having one viewpoint difference) out of a stereoscopic image for printing with a plurality of viewpoints n (n being an integer of 3 or larger) which is printed on the lens sheet selected by the sheet selection unit 22. The display conversion unit 28 of the present embodiment also generates a stereoscopic image for display by performing image processing which converts resolution of a multi-viewpoint image including of the two viewpoint images for printing and the generated virtual viewpoint image, or which performs deformation processing. The display control unit 30 sequentially and repeatedly displays, on the display unit 26, the respective viewpoint images for display, which were subjected to image processing or generated in the display conversion unit 28, to display moving images. As described above, the moving images observed by users is smoothed by inserting virtual viewpoint images.

Figure 15:
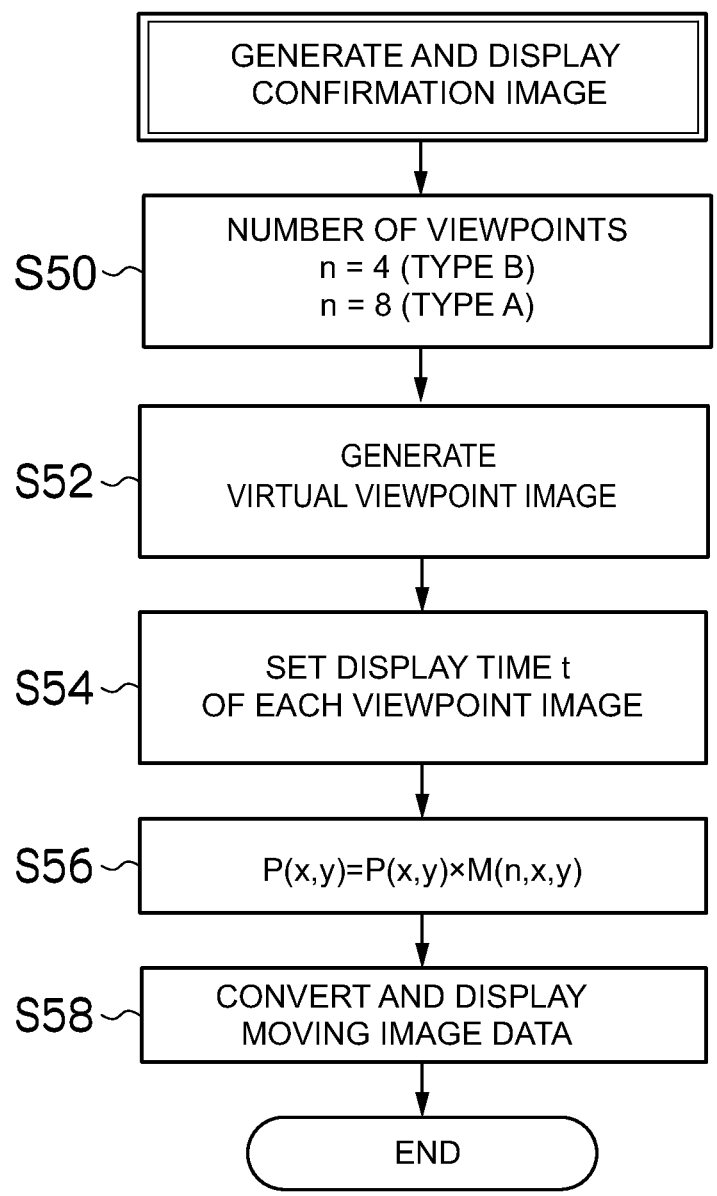
FIG. 15 is a flow chart illustrating one example of generation and display process of a confirmation image in a second embodiment.

FIG. 15 is a flow chart illustrating one example of generation and display process of a stereoscopic image for display (confirmation image) in the second embodiment (step S22 in FIG. 4).

Step S50 is similar to step S30 in FIG. 7.

Next, the display conversion unit 28 generates a virtual viewpoint image from two adjacent viewpoint images for printing out of the stereoscopic image for printing which is printed on the lens sheet selected in steps S6 to S14 of FIG. 4 (step S52).

Figure 16B:
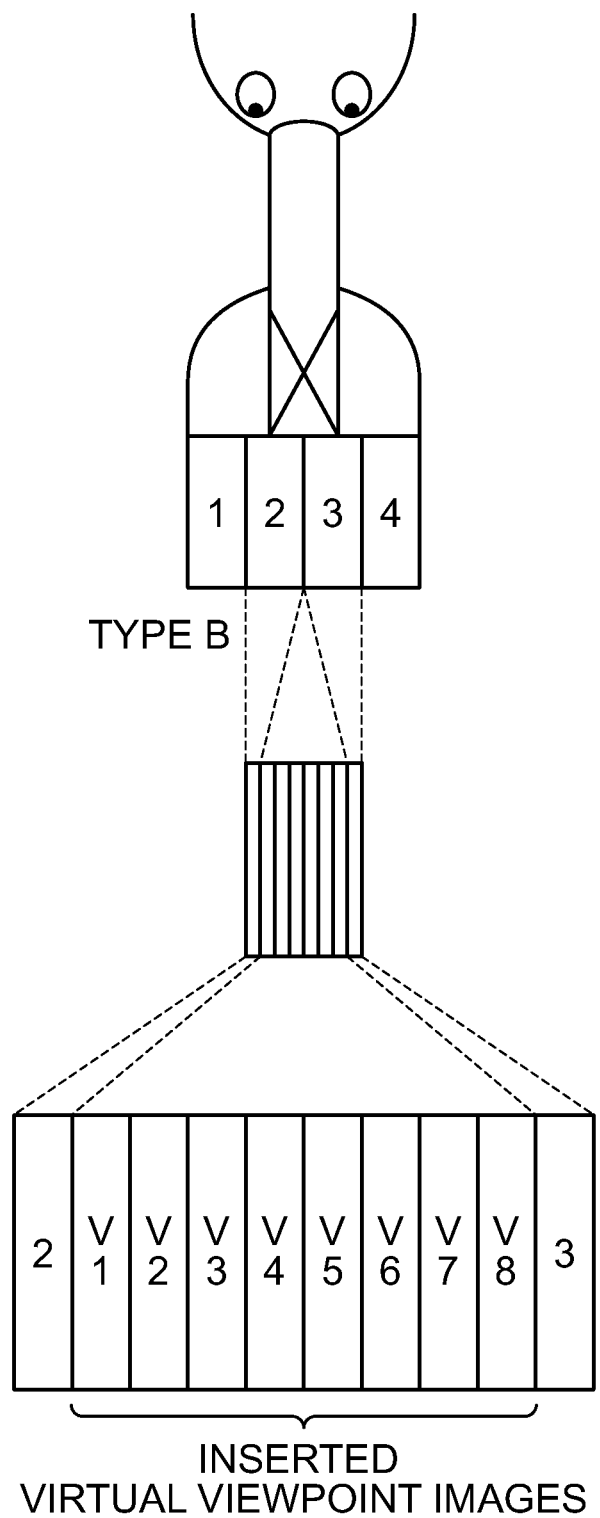
FIG. 16B is an explanatory view used for explaining generating process of a confirmation image in the second embodiment (type B).

For example, in sheet type A illustrated in FIG. 16A, additional fifty six virtual viewpoint images are generated from the stereoscopic image for printing with eight viewpoints which is printed on the lens sheet. For generating fifty six virtual viewpoint images from eight viewpoint images for printing, eight virtual viewpoint images may be generated from each pair of viewpoint images including, for example, a pair of the first and second viewpoints, a pair of the second and third viewpoints, . . . , and a pair of the seventh and eighth viewpoints (total seven pairs). As a consequence, it becomes possible to generate total sixty four viewpoint images for display. For example, in sheet type B illustrated in FIG. 16B, additional twenty eight virtual viewpoint images are generated from a stereoscopic image for printing with four viewpoints which is printed on the lens sheet. For generating twenty eight virtual viewpoint images from four viewpoint images for printing, eight virtual viewpoint images may be generated from each pair of viewpoint images including, for example, a pair of the first and second viewpoints, a pair of the second and third viewpoints, and a pair of the third and fourth viewpoints (total three pairs), and two viewpoint images are extrapolated to each of the first viewpoint image and the fourth viewpoint image. As a consequence, it becomes possible to generate total thirty two viewpoint images for display. It is to be noted that the method (interpolation and extrapolation, the number of inserted viewpoints) for inserting the viewpoint images is not limited to the method disclosed.

Next, the display control unit 30 sets display time t of the respective viewpoint images for display (step S54). For example, when a display repeating cycle during moving image formation of two viewpoint images is set to 240 msec, display time per viewpoint image is set to t=3.75 msec if the stereoscopic image for display has sixty four viewpoints (if the stereoscopic image for printing has eight viewpoints). If the stereoscopic image for display has thirty two viewpoints (if stereoscopic image for printing has four viewpoints), then display time per viewpoint image is set to t=7.5 msec.

Step S56 is similar to step S34 in FIG. 7. For example, in the case of the sheet type, deformation processing is performed on a stereoscopic image for display, which includes viewpoint images for printing and virtual viewpoint images generated from the viewpoint image for the printing, in accordance with the lens intervals (e.g., 50 LPI). As a result, the stereoscopic image for display is generated.

Next, the respective viewpoint images subjected to image processing in step S56 are sequentially and repeatedly displayed on the display unit 26 to display moving images (step S58).

For example, the case of displaying a confirmation image corresponding to sheet type A as illustrated in FIG. 16A, viewpoint images are displayed in order of the first viewpoint, (eight virtual viewpoint images generated from the first and second viewpoints), the second viewpoint, (eight virtual viewpoint images generated from the second and third viewpoints), the third viewpoint, (eight virtual viewpoint images generated from the third and fourth viewpoints), the fourth viewpoint, (eight virtual viewpoint images generated from the fourth and fifth viewpoints), the fifth viewpoint, (eight virtual viewpoint images generated from the fifth and sixth viewpoints), the sixth viewpoint, (eight virtual viewpoint images generated from the sixth and seventh viewpoints), the seventh viewpoint, (eight virtual viewpoint images generated from the seventh and eighth viewpoints), and the eighth viewpoint, and then the viewpoint images are displayed in the order opposite to the above-described sequence, followed by repetition of similar display. For example, in the case of displaying a confirmation image corresponding to sheet type B as illustrated in FIG. 16B, viewpoint images are displayed in order of (two virtual viewpoint images extrapolated from the first viewpoint), the first viewpoint, (eight virtual viewpoint images generated from the first and second viewpoints), the second viewpoint, (eight virtual viewpoint images generated from the second and third viewpoints), the third viewpoint, (eight virtual viewpoint images generated from the third and fourth viewpoints), the fourth viewpoint, and (two virtual viewpoint images extrapolated from the fourth viewpoint), and then viewpoint images are displayed in the order opposite to the above-described sequence, followed by repetition of similar display.

Although the case of performing deformation processing in accordance with the lens intervals has been described as an example in FIG. 15, the presently disclosed subject matter is not limited to such a case. It may be possible to convert resolution of a multi-viewpoint image in accordance with the lens intervals as described in the first embodiment.

In the above-described first and second embodiments, there are various modes for lens sheet selection. In addition to the mode of directly selecting a lens sheet of the selected sheet type, there are, for example, a mode of selecting a housing body such as a cassette that houses lens sheets of the selected sheet type and a mode of selecting a printer (printing unit) which prints with use of lens sheets of the selected sheet type.

Further, although the case where a sheet is selected based on both the near side and far side parallax amounts at congestion points (cross points) has been described as an example, the presently disclosed subject matter is not limited to the case disclosed. For example, in the flow chart of FIG. 4, only one of step S6 (determination of near side frequency) and step S8 (determination of far side frequency) may be performed. Further, in the flow chart of FIGS. 10 and 13 for example, only one of step S6$m$ (determination of the near side maximum parallax amount) and step S8$m$ (determination of the far side maximum parallax amount) may be performed.

It is to be noted that the number of viewpoints of a stereoscopic image (multi-viewpoint image) inputted in the presently disclosed subject matter is not limited to two viewpoints. For example, for generating eight viewpoint images for printing from an inputted multi-viewpoint image with three viewpoints (viewpoint number=1, 2, 3), first, virtual viewpoint images of three viewpoints are inserted in between the inputted viewpoint image (viewpoint number=1) and the inputted viewpoint image (viewpoint number=2), and virtual viewpoint images of three viewpoints are inserted in between the inputted viewpoint image (viewpoint number=2) and the inputted viewpoint image (viewpoint number=3). As a consequence, viewpoint images of total nine viewpoints (viewpoint number=1, A1, A2, A3, 2, B1, B2, B3, 3) can be obtained. Then, out of these nine viewpoint images, eight viewpoint images (such as, eight viewpoint images with viewpoint number=1, A1, A2, A3, 2, B1, B2, B3, and eight viewpoints images with viewpoint number=A1, A2, A3, 2, B1, B2, B3, 3) on one side are selected, so that eight viewpoint images for printing can be obtained.

As described above, in the case of generating viewpoint images for printing by interpolation, first, generally the same number of virtual viewpoint images are each inserted in between the inputted viewpoint images, so that viewpoint images in a number of viewpoints larger than the number of viewpoints of the viewpoint images for printing and closest to the number of viewpoints of the viewpoint images for printing are generated. Next, if the number of viewpoints of the viewpoint images obtained by interpolation is larger than the number of viewpoints of the viewpoint images for printing, then adjacent viewpoint images corresponding to the number of viewpoints of the viewpoint images for printing are selected from the viewpoint images obtained by interpolation. As a consequence, viewpoint images for printing corresponding to the number of viewpoints can be obtained.

In addition to the device invention disclosed in Solution to Problem and described in the aforementioned first and second embodiments, the following method invention is also provided.

There is provided a first method invention, including: an image input step of inputting a multi-viewpoint image with two or more viewpoints; an information acquisition step of acquiring information on distribution of parallax of the inputted multi-viewpoint image; a number-of-viewpoint determination step of determining, based on the acquired information on the distribution of parallax, a number of viewpoints of a stereoscopic image which is printed on a lenticular lens sheet; a viewpoint image generation step of comparing a number of viewpoints of the multi-viewpoint image inputted in the image input step and the number of viewpoints determined in the number-of-viewpoint determination step and generating a shortfall viewpoint image based on the inputted multi-viewpoint image if the number of viewpoints of the inputted multi-viewpoint image is smaller; and a printing step of printing on the lenticular lens sheet the stereoscopic image including the multi-viewpoint image inputted in the image input step and the viewpoint image generated in the viewpoint image generation step.

According to one aspect of the first method invention, in the information acquisition step, there is acquired information indicating at least one frequency, out of a frequency of a parallax amount which exceeds a first threshold on a near side and a frequency of a parallax amount which exceeds a second threshold on a far side among parallax amounts of the inputted multi-viewpoint image, and in the number-of-viewpoint determination step, if the acquired frequency of the parallax amount which exceeds the first threshold exceeds a third threshold, or if the acquired frequency of the parallax amount which exceeds the second threshold exceeds a fourth threshold, the number of viewpoints of the stereoscopic image which is printed on the lenticular lens sheet is increased as compared with a case where the acquired frequency is within the third threshold or the fourth threshold.

According to one aspect of the first method invention, in the information acquisition step, there is acquired information which indicates at least one maximum parallax amount, out of near side and far side maximum parallax amounts among the parallax amounts of the inputted multi-viewpoint image, and in the number-of-viewpoint determination step, if the acquired maximum parallax amount exceeds a specified threshold, the number of viewpoints of the stereoscopic image which is printed on the lenticular lens sheet is increased as compared with a case where they are within the specified threshold.

According to one aspect of the first method invention, in the information acquisition step, there is acquired a parallax range which indicates a difference between the near side maximum parallax amount and the far side maximum parallax amount of the inputted multi-viewpoint image, and in the number-of-viewpoint determination step, if the acquired parallax range exceeds a specified threshold, the number of viewpoints of the stereoscopic image which is printed on the lenticular lens sheet is increased as compared with a case where the acquired parallax range is within the specified threshold.

One aspect of the first method invention further includes a sheet selection step of selecting one lenticular lens sheet from lenticular lens sheets of a plurality of sheet types different in lens intervals, the one lenticular lens sheet being selected based on the number of viewpoints determined in the number-of-viewpoint determination step.

There is provided a second method invention including: an image input step of inputting a stereoscopic image including a multi-viewpoint image with two or more viewpoints; an information acquisition step of acquiring information on distribution of parallax of the inputted multi-viewpoint image; a sheet selection step of selecting one lenticular lens sheet from lenticular lens sheets of a plurality of sheet types different in lens intervals, the one lenticular lens sheet being selected based on the information on the distribution of parallax acquired in the information acquisition step; and a printing step of printing a stereoscopic image including the inputted multi-viewpoint image on the lenticular lens sheet selected in the sheet selection step.

According to one aspect of the second method invention, in the information acquisition step, there is acquired information indicating at least one frequency, out of a frequency of a parallax amount which exceeds a first threshold on a near side and a frequency of a parallax amount which exceeds a second threshold on a far side among parallax amounts of the inputted stereoscopic image, and in the sheet selection step, if the acquired frequency of the parallax amount which exceeds the first threshold exceeds a third threshold, or if the acquired frequency of the parallax amount which exceeds the second threshold exceeds a fourth threshold, there is selected a lenticular lens sheet of a sheet type having larger lens intervals as compared with a case where they are within the third threshold or the fourth threshold.

According to one aspect of the second method invention, in the information acquisition step, there is acquired information which indicates at least one maximum parallax amount, out of near side and far side maximum parallax amounts among the parallax amounts of the inputted multi-viewpoint image, and in the sheet selection step, if the acquired maximum parallax amount exceeds a specified threshold, there is selected a lenticular lens sheet of a sheet type having larger lens intervals as compared with a case where the acquired maximum parallax amount is within the specified threshold.

According to one aspect of the second method invention, in the information acquisition step, there is acquired a parallax range which indicates a difference between the near side maximum parallax amount and the far side maximum parallax amount of the inputted multi-viewpoint image, and in the sheet selection step, if the acquired parallax range exceeds a specified threshold, there is selected a lenticular lens sheet of a sheet type having larger lens intervals as compared with a case where the acquired parallax range is within the specified threshold.

One aspect of the second method invention further includes a viewpoint image generation step of generating, if the number of viewpoints of the inputted multi-viewpoint image is smaller than the number of viewpoints of the stereoscopic image which is printed on the selected lenticular lens sheet, a shortfall viewpoint image based on the inputted multi-viewpoint image.

According to one aspect of the first and second method inventions, the information acquisition step includes: a corresponding point detection step of detecting corresponding points where a left-end viewpoint image and a right-end viewpoint image in the inputted multi-viewpoint image have matching characteristics; and a parallax amount calculation step of calculating a parallax amount between the left-end viewpoint image and the right-end viewpoint image based on the corresponding points detected in the corresponding point detection step, and there is acquired information on magnitude of the parallax amount of the inputted multi-viewpoint image based on the parallax amount calculated in the parallax amount calculation step.

According to one aspect of the first and second method inventions, in the image input step, an image file which stores the multi-viewpoint image together with attribute information is acquired, and in the information acquisition step, the information on the distribution of parallax is acquired from the attribute information in the image file.

According to one aspect of the first and second method inventions, in the printing step, a stereoscopic image is printed on the selected lenticular lens sheet at a peak resolution of the printing step, the stereoscopic image being printed with the number of viewpoints in proportion to the lens intervals of the selected lenticular lens sheet.

One aspect of the first and second method inventions further includes an image processing step of converting resolution of the stereoscopic image which is printed on the lenticular lens sheet selected in the sheet selection step, or performing deformation processing on the respective viewpoint images in accordance with the lens intervals of the lenticular lens sheet; and a display control step of sequentially and repeatedly displaying, on a display unit configured to display a plane image, the respective viewpoint images processed in the image processing step to display moving images.

One aspect of the first and second method inventions further includes a step of generating an image with a virtual viewpoint from two adjacent viewpoint images in a multi-viewpoint image of a plurality of viewpoints n (n being an integer of 3 or larger) which is printed on the lenticular lens sheet selected in the sheet selection step; an image processing step of converting resolution of respective viewpoint images in the stereoscopic image for display which includes the two viewpoint images and the generated viewpoint image of the virtual viewpoint or performing deformation processing on the respective viewpoint images; and a display control step of sequentially and repeatedly displaying, on the display unit configured to display a plane image, the respective viewpoint images processed in the image processing step to display moving images.

According to one aspect of the first and second method inventions, in the image processing step, image processing is performed on the respective viewpoint images in accordance with the lens intervals and lens shapes of the lenticular lens sheet selected in the sheet selection step, so that portions of the respective viewpoint images which correspond to peaks of the lenticular lenses are made lighter and portions corresponding to troughs are made darker.

According to one aspect of the first and second method inventions, in the image processing step, if a lenticular lens sheet with larger lens intervals is selected in the sheet selection step, resolution of the respective viewpoint images is lowered as compared with a case where a lenticular lens sheet with smaller lens intervals is selected.

According to one aspect of the first and second method inventions, in the display control step, display sizes of the respective viewpoint images which are displayed on the display unit are conformed to a print size of the stereoscopic image which is printed on the lenticular lens sheet.

One aspect of the first and second method inventions further includes a type change step of changing the sheet type of the lenticular lens sheet by hand, wherein in the printing step, when the sheet type of the lenticular lens sheet is changed in the type change step, the inputted stereoscopic image is printed on the changed lenticular lens sheet.

The presently disclosed subject matter is not restricted by examples described in this specification nor by the examples illustrated with reference to the drawings. It should naturally be understood that various modifications and variations in design which come within the meaning of the presently disclosed subject matter are possible.

What is claimed is:

1. A stereoscopic image printing device, comprising:
 an image input unit configured to input a multi-viewpoint image with two or more viewpoints;
 an information acquisition unit configured to acquire information on distribution of parallax of the inputted multi-viewpoint image;

a number-of-viewpoint determination unit configured to determine, based on the information on the distribution of parallax acquired by the information acquisition unit, a number of viewpoints of a stereoscopic image which is printed on a lenticular lens sheet;

a comparison unit configured to compare a number of viewpoints of the multi-viewpoint image inputted via the image input unit and the number of viewpoints determined by the number-of-viewpoint determination unit;

a viewpoint image generation unit configured to generate, if the number of viewpoints of the multi-viewpoint image inputted via the image input unit is smaller than the number of viewpoints of the stereoscopic image which is printed on the lenticular lens sheet, a shortfall viewpoint image based on the inputted multi-viewpoint image; and a printing unit configured to print the stereoscopic image including the multi-viewpoint image inputted via the image input unit and the viewpoint image generated by the viewpoint image generation unit, on the lenticular lens sheet.

2. The stereoscopic image printing device according to claim 1, wherein the information acquisition unit acquires information indicating at least one frequency, out of a frequency of a parallax amount which exceeds a first threshold on a near side and a frequency of a parallax amount which exceeds a second threshold on a far side among parallax amounts of the inputted multi-viewpoint image, and if the acquired frequency of the parallax amount which exceeds the first threshold exceeds a third threshold, or if the acquired frequency of the parallax amount which exceeds the second threshold exceeds a fourth threshold, the number-of-viewpoint determination unit increases the number of viewpoints of the stereoscopic image printed on the lenticular lens sheet as compared with a case where the acquired frequency of the parallax amount which exceeds the first threshold is within the third threshold and the acquired frequency of the parallax amount which exceeds the second threshold is within the fourth threshold.

3. The stereoscopic image printing device according to claim 1, wherein the information acquisition unit acquires information which indicates at least one maximum parallax amount out of near side and far side maximum parallax amounts among the parallax amounts of the inputted multi-viewpoint image, and if the acquired maximum parallax amount exceeds a specified threshold, the number-of-viewpoint determination unit increases the number of viewpoints of the stereoscopic image printed on the lenticular lens sheet as compared with a case where the acquired maximum parallax amount is within the specified threshold.

4. The stereoscopic image printing device according to claim 1, wherein the information acquisition unit acquires a parallax range which indicates a difference between a near side maximum parallax amount and a far side maximum parallax amount of the inputted multi-viewpoint image, and if the acquired parallax range exceeds a specified threshold, the number-of-viewpoint determination unit increases the number of viewpoints of the stereoscopic image printed on the lenticular lens sheet as compared with a case where the acquired parallax range is within the specified threshold.

5. The stereoscopic image printing device according to claim 1, further comprising:

a sheet selection unit configured to select one lenticular lens sheet from lenticular lens sheets of a plurality of sheet types different in lens intervals, the one lenticular lens sheet being selected based on the number of viewpoints determined by the number-of-viewpoint determination unit.

6. The stereoscopic image printing device according to claim 1, wherein the information acquisition unit includes:

a corresponding point detection unit configured to detect corresponding points where a left-end viewpoint image and a right-end viewpoint image in the inputted multi-viewpoint image have matching characteristics; and a parallax amount calculation unit configured to calculate a parallax amount between the left-end viewpoint image and the right-end viewpoint image based on the corresponding points detected by the corresponding point detection unit, and the information acquisition unit acquires information on the distribution of parallax of the inputted multi-viewpoint image based on the parallax amount calculated by the parallax amount calculation unit.

7. The stereoscopic image printing device according to claim 1, wherein the image input unit acquires an image file which stores the multi-viewpoint image together with attribute information, and the information acquisition unit acquires information on the distribution of parallax of the inputted multi-viewpoint image from the attribute information in the image file.

8. The stereoscopic image printing device according to claim 1, wherein the printing unit is configured to print on the lenticular lens sheet a stereoscopic image at a peak resolution of the printing unit, the printing unit printing the stereoscopic image with the number of viewpoints in proportion to the lens intervals of the lenticular lens sheet.

9. The stereoscopic image printing device according to claim 1, further comprising:

a display unit configured to display a plane image;

an image processing unit configured to convert resolution of respective viewpoint images of the stereoscopic image which is printed on the lenticular lens sheet or to perform deformation processing on the respective viewpoint images in accordance with the lens intervals of the lenticular lens sheet; and a display control unit configured to sequentially and repeatedly display on the display unit the respective viewpoint images processed by the image processing unit to display moving images.

10. The stereoscopic image printing device according to claim 1, further comprising:

a display unit configured to display a plane image;

a virtual viewpoint image generation unit configured to generate a viewpoint image of a virtual viewpoint from two adjacent viewpoint images out of the stereoscopic image with n viewpoints (n being an integer of 3 or larger) which is printed on the lenticular lens sheet;

an image processing unit configured to convert resolution of respective viewpoint images in a stereoscopic image for display which includes the two viewpoint images and the generated viewpoint image of the virtual viewpoint, or to perform deformation processing on the respective viewpoint images; and a display control unit configured to sequentially and repeatedly display on the display unit the respective viewpoint images processed by the image processing unit to display moving images.

11. The stereoscopic image printing device according to claim 9,
wherein the image processing unit performs image processing on the respective viewpoint images in accordance with the lens intervals and lens shapes of the lenticular lens sheet so that portions of the respective viewpoint images which correspond to peaks of the lenticular lenses are made lighter and portions corresponding to troughs are made darker.

12. The stereoscopic image printing device according to claim 9,
wherein the image processing unit lowers the resolution of the respective viewpoint images as the lens intervals of the lenticular lens sheet are larger.

13. The stereoscopic image printing device according to claim 9,
wherein the display control unit conforms display sizes of the respective viewpoint images which are displayed on the display unit to a print size of the stereoscopic image which is printed on the lenticular lens sheet.

14. The stereoscopic image printing device according to claim 1, further comprising:
a type change unit configured to change the sheet type of the lenticular lens sheet by hand,
wherein when the sheet type of the lenticular lens sheet is changed by the type change unit, the printing unit prints the stereoscopic image on a changed lenticular lens sheet.

15. A method for stereoscopic image printing, comprising:
an image input step of inputting a multi-viewpoint image with two or more viewpoints;
an information acquisition step of acquiring information on distribution of parallax of the inputted multi-viewpoint image;
a number-of-viewpoint determination step of determining, based on the acquired information on the distribution of parallax, a number of viewpoints of a stereoscopic image which is printed on a lenticular lens sheet;
a viewpoint image generation step of comparing a number of viewpoints of the multi-viewpoint image inputted in the image input step and the number of viewpoints determined in the number-of-viewpoint determination step and generating a shortfall viewpoint image based on the inputted multi-viewpoint image if the number of viewpoints of the inputted multi-viewpoint image is smaller; and
a printing step of printing the stereoscopic image including the multi-viewpoint image inputted in the image input step and the viewpoint image generated in the viewpoint image generation step, on the lenticular lens sheet.

16. The method for stereoscopic image printing according to claim 15,
wherein in the information acquisition step, there is acquired information indicating at least one frequency, out of a frequency of a parallax amount which exceeds a first threshold on a near side and a frequency of a parallax amount which exceeds a second threshold on a far side among parallax amounts of the inputted multi-viewpoint image, and
in the number-of-viewpoint determination step, if the acquired frequency of the parallax amount which exceeds the first threshold exceeds a third threshold, or if the acquired frequency of the parallax amount which exceeds the second threshold exceeds a fourth threshold, the number of viewpoints of the stereoscopic image which is printed on the lenticular lens sheet is increased as compared with a case where the acquired frequency of the parallax amount which exceeds the first threshold is within the third threshold and the acquired frequency of the parallax amount which exceeds the second threshold is within the fourth threshold.

17. The method for stereoscopic image printing according to claim 15,
wherein in the information acquisition step, there is acquired information which indicates at least one maximum parallax amount, out of near side and far side maximum parallax amounts among the parallax amounts of the inputted multi-viewpoint image, and
in the number-of-viewpoint determination step, if the acquired maximum parallax amount exceeds a specified threshold, the number of viewpoints of the stereoscopic image which is printed on the lenticular lens sheet is increased as compared with a case where the acquired maximum parallax amount is within the specified threshold.

18. The method for stereoscopic image printing according to claim 15,
wherein in the information acquisition step, there is acquired a parallax range which indicates a difference between a near side maximum parallax amount and a far side maximum parallax amount of the inputted multi-viewpoint image, and
in the number-of-viewpoint determination step, if the acquired parallax range exceeds a specified threshold, the number of viewpoints of the stereoscopic image which is printed on the lenticular lens sheet is increased as compared with a case where the acquired parallax range is within the specified threshold.

19. The method for stereoscopic image printing according to claim 15, further comprising:
a sheet selection step of selecting one lenticular lens sheet from lenticular lens sheets of a plurality of sheet types different in lens intervals, the one lenticular lens sheet being selected based on the number of viewpoints determined in the number-of-viewpoint determination step.

20. The method for stereoscopic image printing according to claim 15,
wherein the information acquisition step includes:
a corresponding point detection step of detecting corresponding points where a left-end viewpoint image and a right-end viewpoint image in the inputted multi-viewpoint image have matching characteristics; and
a parallax amount calculation step of calculating a parallax amount between the left-end viewpoint image and the right-end viewpoint image based on the corresponding points detected in the corresponding point detection step, and
there is acquired information on magnitude of the parallax amount of the inputted multi-viewpoint image based on the parallax amount calculated in the parallax amount calculation step.

* * * * *